United States Patent
Fujiwara

(10) Patent No.: US 7,301,012 B2
(45) Date of Patent: Nov. 27, 2007

(54) AZO DYE, IMAGE-FORMING COLORING COMPOSITION, INK FOR INK JET RECORDING, HEAT-SENSITIVE RECORDING MATERIAL, COLOR TONER AND COLOR FILTER

(75) Inventor: Toshiki Fujiwara, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 373 days.

(21) Appl. No.: 10/961,267

(22) Filed: Oct. 12, 2004

(65) Prior Publication Data

US 2005/0083391 A1   Apr. 21, 2005

(30) Foreign Application Priority Data

Oct. 14, 2003   (JP) ............................. 2003-353499

(51) Int. Cl.
  *C09B 31/14*   (2006.01)
  *C09D 11/00*   (2006.01)
  *B41J 2/01*   (2006.01)
  *B41M 5/388*   (2006.01)
  *G03G 9/09*   (2006.01)

(52) U.S. Cl. ................. 534/752; 534/649; 534/DIG. 2; 106/31.48; 359/885; 430/108.23; 503/227

(58) Field of Classification Search ................. 534/649, 534/752, DIG. 2; 106/31.48; 430/108.23; 359/885; 503/227
See application file for complete search history.

(56) References Cited

U.S. PATENT DOCUMENTS

| 3,150,136 | A | * | 9/1964 | Menzel et al. | ............... 544/250 |
| 4,808,501 | A | | 2/1989 | Chiulli | |
| 7,083,670 | B2 | * | 8/2006 | Takasaki et al. | ......... 106/31.52 |

FOREIGN PATENT DOCUMENTS

| DE | 25 13 949 A1 | 10/1976 |
| DE | 25 25 505 A1 | 12/1976 |
| DE | 28 32 020 A1 | 1/1980 |
| EP | 0 023 309 A1 | 2/1981 |
| JP | 49-74718 A | 7/1974 |
| JP | 60-2398 A | 1/1985 |
| JP | 3-276161 A | 12/1991 |
| JP | 6-35182 A | 2/1994 |
| JP | 7-209912 A | 8/1995 |
| JP | 8-123085 A | 5/1996 |
| JP | 11-209673 A | 8/1999 |
| JP | 3020660 B2 | 1/2000 |
| JP | 2001-335714 A | 12/2001 |
| JP | 2004-75898 | * 3/2004 |

* cited by examiner

*Primary Examiner*—Fiona T. Powers
(74) *Attorney, Agent, or Firm*—Buchanan Ingersoll & Rooney PC

(57) ABSTRACT

An azo dye comprising a coupler having a specific structure as a coupling component, an image-forming coloring composition comprising the azo dye, an ink for ink jet recording and an ink jet recording method using the image-forming coloring composition and a heat-sensitive recording material, a color toner and a color filter formed by the image-forming coloring composition.

9 Claims, No Drawings

AZO DYE, IMAGE-FORMING COLORING COMPOSITION, INK FOR INK JET RECORDING, HEAT-SENSITIVE RECORDING MATERIAL, COLOR TONER AND COLOR FILTER

BACKGROUND OF THE INVENTION

1. Field of the Invention

The present invention relates to an aromatic nitrogen-containing heterocyclic azo dye, a coloring composition comprising the azo dye for use in image formation, etc., and an ink for ink jet recording, an ink jet recording method, a heat-sensitive recording material, a color toner and a color filter using the same.

2. Background of the Related Art

In recent years, as an image recording material there has been mainly used a material for forming a color image. In some detail, recording materials for ink jet recording, heat-sensitive transferring type recording materials, electrophotographic recording materials, transferring silver halide light-sensitive materials, printing inks, recording pens, etc. have been widely used. A color filter is used to record and reproduce a color image in such picture-taking apparatus as imaging devices (e.g., CCD) and displays such as LCD and PDP.

These color image recording materials and color filters comprise coloring agents (dye or pigment) of so-called additive or subtractive primaries to reproduce or record a full-color image. However, it is the status of quo that there is no fast coloring agents that have absorption characteristics allowing the realization of desirable color reproduction region and can withstand various working and atmospheric conditions. It has thus been keenly desired to provide improved coloring agents.

The ink jet recording method has been rapidly spread and further developed because it requires inexpensive materials, enables high speed recording, generates little noises and allows easy color recording.

Examples of the ink jet recording method include continuous process involving continuous flying of droplets and on-demand process involving flying of droplets according to image data signal. Examples of ink ejection method include a method which allows a piezoelectric element to give pressure that causes a droplet to be ejected, a method which comprises heating the ink to generate bubbles, causing a droplet to be ejected, a method involving the use of ultrasonic wave, and a method which uses electrostatic force to suck and discharge a droplet. As inks for these ink jet recording methods there are used aqueous inks, oil-based inks and solid (melt type) inks.

The dyes to be incorporated in these inks for ink jet recording are required to exhibit a high solubility or dispersibility in solvents, allow a high density recording and have a good hue and a good fastness to light, heat and active gases in the atmosphere (oxidizing gases such as NOx and ozone and SOx), an excellent fastness to water and chemicals, a good fixability to image-receiving materials giving difficulty in running, an excellent preservability as inks, no toxicity and a high purity and be available at a low cost. However, it is extremely difficult to seek coloring agents meeting these requirements to a high extent. In particular, it has been keenly desired to provide a coloring agent which exhibits a good hue as a hue for compensating that of black dyes on the long wavelength side and a good fastness to light, moisture and heat, particularly to oxidizing gases such as ozone in the atmosphere when printed on an image-receiving material having an ink-receiving layer containing a porous white inorganic particulate material.

Color copiers and color laser printers utilizing electrophotographic process normally use toners having a coloring agent dispersed in a particulate resin. Color toners are required to have absorption characteristics realizing desirable color reproduction region, particularly a high light transmittance (transparency) required in the use with over head projector (hereinafter referred to as "OHP") and various fastnesses under actual atmospheric conditions. Toners having a pigment dispersed in a particulate material as a coloring agent are disclosed in JP-A-62-157051, JP-A-62-255956, JP-A-6-118715, etc. These toners are excellent in light-resistance but are disadvantageous in that they are insoluble and thus can be easily agglomerated, causing deterioration of transparency and change of hue of transmitted light. On the other hand, toners comprising a dye as a coloring agent are disclosed in JP-A-3-276161, JP-A-7-209912, JP-A-8-123085, etc. Unlike the aforementioned toners, these toners have a high transparency and show no hue change but are disadvantageous in light-resistance.

The heat-sensitive recording method is advantageous in that it employs a small-sized apparatus realizing cost reduction, allows easy operation and maintenance and requires reduced running cost. Coloring agents for use in heat-sensitive recording are required to have absorption characteristics realizing desirable color reproduction region, accomplish both desired heat transferability and fixability after transfer at the same time, exhibit a high thermal stability and provide an image with various fastnesses. However, there are no known coloring agents which can meet all these requirements. For example, a heat-sensitive recording material and an image-forming method involving the chelation of a heat-diffusive dye with a transition metal ion previously incorporated in an image-recording material for the purpose of improving fixability and light-resistance are proposed in JP-A-60-2398, etc. However, the aforementioned proposal is disadvantageous in that it produces a chelate dye having unsatisfactory absorption characteristics and requires the use of transition metals that cause environmental problems.

The color filter is required to have a high transparency. Thus, in order to prepare the color filter, a so-called dyeing method involving the coloring with a dye has been practiced. A color filter can be produced, e.g., by successively repeating for all the filter colors a step which comprises subjecting a dyable photoresist to pattern wise exposure and development to form a pattern, and then dyeing the pattern with a dye of the filter color. Besides the dyeing method, a method involving the use of a positive resist as disclosed in U.S. Pat. No. 4,808,501 and JP-A-6-35182 can be employed to produce a color filter. These methods require the use of a dye and thus can provide a color filter with a high transmittance and excellent optical characteristics but are limited in light-resistance, heat resistance, etc. It has thus been desired to develop a coloring agent having an excellent resistance to various conditions and a high transparency. On the other hand, methods involving the use of an organic pigment having excellent light-resistance and heat resistance instead of dye have been widely known. However, a color filer comprising a pigment can difficultly exhibit optical properties as obtained with dyes.

The coloring agents for use in the aforementioned various purposes have requirements common to all. In some detail, these coloring agents are required to have absorption characteristics desirable for color reproduction, good fastness to actual atmospheric conditions such as light, heat, moisture and oxidizing gases such as ozone and chemicals such as sulfite gas, a great molar absorptivity, etc.

As coupling components of azo dye there have heretofore been widely used phenol, naphthol, aniline, etc. As azo dyes having a good hue obtained by these coupling components there are known those disclosed in JP-A-11-209673, Japanese Patent 3,020,660, etc. However, these dyes are disadvantageous in that they have deteriorated light-fastness.

As an approach for eliminating these problems there has been recently disclosed a coloring agent having a good hue and enhanced light-fastness in JP-A-2001-335714. However, all the coloring agents known in these patents or specifications leave much to be desired in fastness to oxidizing gases such as ozone. In order to develop a coloring agent fast to oxidizing gases such as ozone, the present inventors have worked out an idea that nitrogen-containing heterocyclic compounds should be used as coupling components instead of related art coupling components such as phenol, naphthol and aniline. As patent applications concerning azo dyes comprising pyridine and pyrazine as coupling components there have been known JP-A-49-74718, European Patent 23,309, German Patent 2,513,949, German Patent 2,832,020, Patent German Patent 2,525,505, etc. However, it was not known in those days that these dyes are used in image formation processes such as ink jet recording. Further, the azo dyes disclosed in these patents leave something to be desired in fastness to light, heat, moisture and ambient active gases such as ozone. Moreover, aza acridone skeletons are known, but disazo dyes comprising this skeleton as a coupler have never been known.

SUMMARY OF THE INVENTION

The invention is intended to solve the aforementioned problems with the related art and thus accomplish the following aims.

In other words, an aim of the invention is to provide a novel azo dye excellent in hue and fastness.

Another aim of the invention is to provide an image-forming coloring composition which can give a colored image or coloring material excellent in hue and fastness and thus can be used to advantage to prepare a printing ink for ink jet recording, etc., an ink sheet in heat-sensitive recording material, a color toner for electrophotography, a color filter for display such as LCD and PDP or imaging device such as CCD and a dyeing solution for dyeing various fibers.

A further aim of the invention is to provide a an ink for ink jet recording and ink jet recording method capable of forming an image having a good hue and a high fastness to light and ambient active gases, particularly ozone gas.

A still further aim of the invention is to provide a heat-sensitive recording material which gives an image having an excellent light-fastness and a sharp hue.

A still further aim of the invention is to provide a color toner which exhibits an excellent light-fastness, a faithful color reproducibility and a high OHP quality.

A still further aim of the invention is to provide a color filter which exhibits an excellent color reproducibility and light-fastness.

The inventors made extensive studies of various dyes compound derivatives aiming at dyes which exhibit a good hue and a high fastness to light and ozone. As a result, it was found that the aforementioned problems can be solved by the azo dye of the following general formula (1).

In other words, in accordance with the invention, an azo dye having the following structure, an image-forming coloring composition and an ink for ink jet recording comprising the azo dye, an ink jet recording method using the ink, and a heat-sensitive recording material, a color toner and a color filter comprising the azo dye can be provided to accomplish the aforementioned aims of the invention.

(1) An azo dye represented by formula (1):

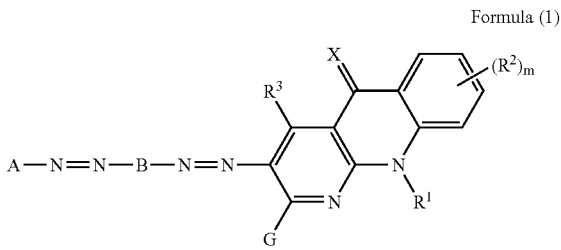

Formula (1)

wherein A and B each independently represents an aromatic group which may be substituted or a heterocyclic group which may be substituted, wherein A is a monovalent group and B is a divalent group;

$R^1$, $R^2$, $R^3$ and G each independently represents a hydrogen atom; a halogen atom; an aliphatic group; an aromatic group; a heterocyclic group; a cyano group; a carboxyl group; a carbamoyl group; an alkoxycarbonyl group; an aryloxycarbonyl group; an acyl group; a hydroxyl group; an alkoxy group; an aryloxy group; a silyloxy group; an acyloxy group; a carbamoyloxy group; a heterocyclic oxy group; an alkoxycarbonyloxy group; an aryloxycarbonyloxy group; an amino group substituted by an alkyl group, an aryl group or a heterocyclic group; an acylamino group; an ureido group; a sulfamoylamino group; an alkoxycarbonylamino group; an aryloxycarbonylamino group; an alkylsulfonylamino group; an arylsulfonylamino group; a nitro group; an alkylthio group; an arylthio group; an alkylarylsulfonyl group; an arylsulfonyl group; an alkylsulfinyl group; an arylsulfinyl group; a sulfamoyl group; a sulfo group; or a heterocyclic thio group, and $R^1$, $R^2$, $R^3$ and G may be substituted;

X represents an oxygen atom or a sulfur atom;

m represents an integer of from 0 to 4 and a number of substituent(s) other than hydrogen atom(s).

(2) The azo dye described in (1) above, wherein when m is from 2 to 4, $R^2$'s are the same or different.

(3) The azo dye described in (1) or (2) above, wherein A is a benzene ring which may be substituted, or a naphthalene ring which may be substituted; and B is a benzene ring which may be substituted, a naphthalene ring which may be substituted, or a heterocyclic ring selected from (a), (b), (c), (d) or (e):

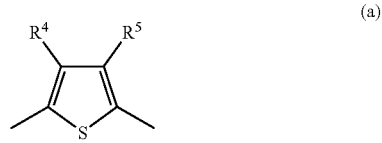

(a)

(b)

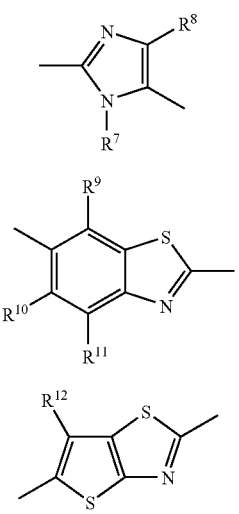

wherein $R^4$ to $R^{12}$ each independently represents a hydrogen atom; a halogen atom; an aliphatic group; an aromatic group; a heterocyclic group; a cyano group; a carboxyl group; a carbamoyl group; an alkoxycarbonyl group; an aryloxycarbonyl group; an acyl group; a hydroxyl group; an alkoxy group; an aryloxy group; a silyloxy group; an acyloxy group; a carbamoyloxy group; a heterocyclic oxy group; an alkoxycarbonyloxy group; an aryloxycarbonyloxy group; an amino group substituted by an alkyl group, an aryl group or a heterocyclic group; an acylamino group; an ureido group; a sulfamoylamino group; an alkoxycarbonylamino group; an aryloxycarbonylamino group; an alkylsulfonylamino group; an arylsulfonylamino group; a nitro group; an alkylthio group; an arylthio group; an alkylarylsulfonyl group; an arylsulfonyl group; an alkylsulfinyl group; an arylsulfinyl group; a sulfamoyl group; a sulfo group; or a heterocyclic thio group.

(4) An image-forming coloring composition comprising at least one azo dye represented by formula (1) described in (1) above.

(5) An ink for ink jet recording comprising at least one azo dye represented by formula (1) described in (1) above.

(6) An ink jet recording method comprising forming an image with an ink for ink jet recording according to (5) above.

(7) A heat-sensitive recording material comprising an azo dye according to (1) above.

(8) A color toner comprising an azo dye according to (1) above.

(9) A color filter comprising an azo dye according to (1) above.

DETAILED DESCRIPTION OF THE INVENTION

The invention will be further described hereinafter.

[Azo Dye]

The azo dye represented by the aforementioned general formula (1) of the invention will be further described hereinafter.

In the general formula (1), the groups A and B each independently represents aromatic group which may be substituted or heterocyclic group which may be substituted.

Examples of aromatic rings employable herein include a benzene ring and a naphthalene ring. These rings may be substituted by any substituents. For example, the group A may have azo groups so that the azo dye of the general formula (1) forms a trisazo dye. Examples of these substituents which may substitute these rings include those represented by $R^1$, $R^2$, $R^3$ and G shown below.

Examples of the hetero atoms of heterocyclic group include nitrogen, oxygen, and sulfur. Aliphatic rings, aromatic rings or other heterocyclic groups may be condensed to the heterocyclic group.

The group A is preferably a benzene ring which may be substituted or a naphthalene ring which may be substituted. Preferred examples of the group B include a benzene ring which may be substituted, a naphthalene ring which may be substituted, and heterocyclic groups shown below.

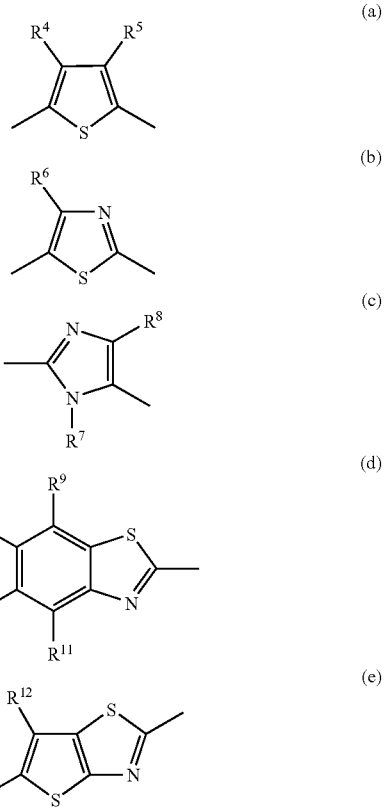

$R^4$ to $R^{12}$ in the general formulae (a) to (e) each represents a substituent having the same meaning as the substituent G described later.

Preferred among the general formulae (a) to (e) are thiophene ring, thiazole ring, imidazole ring and thienothiazole ring represented by the general formulae (a), (b), (c) and (e), respectively.

$R^1$, $R^2$, $R^3$ and G in the general formula (1) each independently represents a hydrogen atom or a halogen atom, or an aliphatic group, an aromatic group, a heterocyclic group, a cyano group, a carboxyl group, a carbamoyl group, an alkoxycarbonyl group, an aryloxycarbonyl group, an acyl group, a hydroxyl group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted by an alkyl, an aryl group or a heterocyclic group, an acylamino group, an ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, a heterocyclic thio group, an alkylsulfonyl group, an arylsulfonyl group, an alkylsulfinyl group, an arylsulfinyl group, a sulfamoyl group or a sulfo group, and these groups may be further substituted.

Examples of the aromatic ring A include benzene ring, and naphthalene ring. Furthermore, these aromatic rings may be substituted by any substituents. Preferred examples of the substituents which may substitute these aromatic rings include electron-withdrawing groups. In some detail, an electron-withdrawing group having a Hammett's σp value of 0.2 or more is preferred.

The Hammett's substituent constant σp will be further described hereinafter.

Hammett's rule is an empirical rule which L. P. Hammett proposed in 1935 to quantitatively discuss the effect of substituents on the reaction or equilibrium of benzene derivatives. The validity of this empirical rule has been widely accepted today. Substituent constants required in Hammett's rule are σp value and m value. These values are found in many general literatures. For the details of these values, reference can be made to J. A. Dean, "Lange's Handbook of Chemistry", 12th ed., 1979 (Mc Graw-Hill), and "Kagaku no Ryoiki (Region of Chemistry)", extra edition, No. 122, pp. 96 to 103, 1979 (Nankodo). In the invention, these substituents are defined or described by Hammett's substituent constant σp. However, this doesn't mean that the known values found in the aforementioned literatures are not limited to certain substituents. It goes without saying that even if the values are unknown in literatures, they contain substituents which may fall within the defined range when measured according to Hammett's rule. The compounds of the general formula (1) of the invention contain those which are not benzene derivatives. As a measure for indicating the electron effect of substituents there is used σp value regardless of substitution position. In the invention, σp value is used in this sense.

Examples of the electron-withdrawing group having a Hammett's substituent constant σp of not smaller than 0 60 include cyano group, nitro group, alkylsulfonyl group (e.g., methylsulfonyl), and arylsulfonyl (e.g., benzenesulfonyl group).

Examples of the electron-withdrawing group having a Hammett's substituent constant σp of not smaller than 0.45 include acyl groups (e.g., acetyl group), alkoxycarbonyl groups (e.g., dodecyloxycarbonyl group), aryloxycarbonyl groups (e.g., m-chlorophenoxycarbonyl), alkylsulfinyl groups (e.g., n-propylsulfinyl), arylsulfinyl groups (e.g., phenylsulfinyl), sulfamoyl groups (e.g., N-ethylsulfamoyl, N,N-dimethylsulfamoyl), and halogenated alkyl groups (e.g., trifluoromethyl), in addition to the aforementioned groups.

Examples of the electron-withdrawing group having a Hammett's: substituent constant σp of not smaller than 0.30 include acyloxy groups (e.g., acetoxy group), carbamoyl groups (e.g., N-ethylcarbamoyl groups, N,N-dibutylcarbamoyl group), halogenated alkoxy groups (e.g., trifluoromethyloxy group), halogenated aryloxy groups (e.g., pentafluorophenyloxy group), sulfonyloxy groups (e.g., methylsulfonyloxy group), halogenated alkylthio groups (e.g., difluoromethylthio group), aryl groups substituted by two or more electron-withdrawing groups having a up value of not smaller than 0.15 (e.g., 2,4-dinitrophenyl group, pentafluorophenyl group), and heterocyclic groups (e.g., 2-benzooxazolyl group, 2-benzothiazolyl group, 1-phenyl-2-benzoimidazolyl group), in addition to the aforementioned groups.

Specific examples of the electron-withdrawing group having a σp value of not smaller than 0.20 include halogen atoms, in addition to the aforementioned groups.

Preferred examples of the substituent represented by $R^1$ include a hydrogen atom, an aliphatic group, and an aromatic group.

Preferred examples of the substituent represented by $R^2$ include a hydrogen atom, a halogen atom, a cyano group, an aliphatic group, an aromatic group, a hydroxyl group, an alkoxy group, an aryloxy group, an acyloxy group, a heterocyclic oxy group, an amino group substituted by an alkyl group, an aryl group or a heterocyclic group., an acylamino group, an ureido group, a sulfamoylamino group, an alkoxycarbonylamino group, an aryloxycarbonylamino group, an alkylthio group, an arylthio group and a heterocyclic thio group. Even more desirable among these groups are a hydrogen atom, a halogen atom, a cyano group, an aliphatic group, an aromatic group, a hydroxyl group, and an alkoxy group.

Preferred examples of the substituent represented by $R^3$ include a hydrogen atom, a halogen atom, an aliphatic group, an aromatic group, a hydroxyl group, an alkoxy group, an aryloxy group, an acyloxy group, a heterocyclic oxy group, an amino group substituted by an alkyl group, an aryl group or a heterocyclic group, an acylamino group, an ureido group, a sulfamoylamino group, an alkoxycarbonylamino group, an aryloxycarbonylamino group, an alkylthio group, an arylthio group, and a heterocyclic thio group. Even more desirable among these groups are a hydrogen atom, a halogen atom, an aliphatic group, an aromatic group, and an alkoxy group.

Preferred examples of the substituent represented by G include a hydrogen atom, a halogen atom, an aliphatic group, an aromatic group, a hydroxyl group, an alkoxy group, an aryloxy group, an acyloxy group, a heterocyclic oxy group, an amino group substituted by an alkyl group, an aryl group or a heterocyclic group, an acylamino group, an ureido group, a sulfamoylamino group, an alkoxycarbonylamino group, an aryloxycarbonylamino group, an alkylthio group, an arylthio group, and a heterocyclic thio group. Even more desirable among these groups are a hydrogen atom, a halogen atom, an alkyl group, a hydroxyl group, an alkoxy group, an aryloxy group, an acyloxy group, an amino group substituted by an alkyl group, an aryl group or a heterocyclic group and an acylamino group. Most desirable among these groups are a hydrogen atom, an arylamino group, and an amide group. These groups may further have substituents.

X represents an oxygen-atom or a sulfur atom.

The suffix m represents an integer of from 0 to 4 and a number of substituent(s) other than hydrogen atom(s).

In case of each substituent represented by $R^1$, $R^2$, $R^3$ and G further has substituents, examples of the substituents include those listed with reference to G, $R^1$, $R^2$, and $R^3$.

The azo dye represented by the general formula (1) if it is water-soluble, preferably has an ionic hydrophilic group on any position on A, B, $R^1$, $R^2$, $R^3$, and G as a substituent. Examples of the ionic hydrophilic group which is a substituent include sulfo groups, phosphono groups, carboxyl groups and quaternary ammonium groups. Preferred among the ionic hydrophilic groups are carboxyl groups, and sulfo groups. Particularly preferred among these ionic hydrophilic groups are sulfo groups. The carboxyl and sulfo groups may be in the form of salt. Examples of the counter ion constituting the salt include ammonium ion, alkaline metal ion (e.g., lithium ion, sodium ion, potassium ion), and organic cation (e.g., tetramethyl guanidium ion, tetramethyl ammonium ion).

The substituents represented by G, $R^1$, $R^2$, and $R^3$ will be further described hereinafter.

Examples of the halogen atom include fluorine atom, chlorine atom and bromine atom.

The term "aliphatic group" as used herein is meant to include an alkyl group, substituted alkyl group, alkenyl group, substituted alkenyl group, alkinyl group, substituted alkinyl group, aralkyl group, and substituted aralkyl group. The aliphatic group may have branches or may form a ring. The aliphatic group preferably has from 1 to 20 carbon atoms, more preferably from 1 to 16 carbon atoms. The aryl moiety of the aralkyl group or substituted aralkyl group is preferably a phenyl group or naphthyl group, particularly a phenyl group. Examples of the aliphatic group include methyl group, ethyl group, butyl group, isopropyl group, t-butyl group, hydroxyethyl group, methoxyethyl group, cyanoethyl group, trifluoromethyl group, 3-sulfopropyl group, 4-sulfobutyl group, cyclohexyl group, benzyl group, 2-phenethyl group, vinyl group, and allyl group.

The term "aromatic group" as used herein is meant to include an aryl group and substituted aryl group. The aryl group is preferably a phenyl group or naphthyl group, particularly a phenyl group. The aromatic group preferably has from 6 to 20 carbon atoms, more preferably from 6 to 16 carbon atoms.

Examples of the aromatic group include phenyl group, p-tollyl group, p-methoxyphenyl group, o-chlorophenyl group, and m-(3-sulfopropylamino)phenyl group.

The term "heterocyclic group" as used herein is meant to include substituted and unsubstituted heterocyclic groups. The heterocyclic group may have aliphatic or aromatic rings or other heterocyclic groups condensed thereto. The heterocyclic group is preferably a 5- or 6-membered heterocyclic group. Examples of the substituents on the heterocyclic group include aliphatic groups, halogen atoms, alkylsulfonyl groups, arylsulfonyl groups, acyl groups, acylamino groups, sulfamoyl groups, carbamoyl groups, and ionic hydrophilic groups. Examples of the heterocyclic group include 2-pyridyl group, 2-chenyl group, 2-thiazolyl group, 2-benzothiazolyl group, 2-benzoxazolyl group, and 2-furyl group.

The term "carbamoyl group" as used herein is meant to include substituted and unsubstituted carbamoyl groups. Examples of the substituents on the carbamoyl group include alkyl groups. Examples of the carbamoyl group include methylcarbamoyl group and dimethylcarbamoyl group.

The term "alkoxycarbonyl group" as used herein is meant to include substituted and unsubstituted alkoxycarbonyl groups. The alkoxycarbonyl group preferably has from 2 to 12 carbon atoms. Examples of the substituents on the alkoxycarbonyl group include ionic hydrophilic groups. Examples of the alkoxycarbonyl group include methoxycarbonyl group and ethoxycarbonyl group.

The term "aryloxycarbonyl group" as used herein is meant to include substituted and unsubstituted aryloxycarbonyl groups. The aryloxycarbonyl group preferably has from 7 to 12 carbon atoms. Examples of the substituents on the aryloxycarbonyl group include ionic hydrophilic groups. Examples of the aryloxycarbonyl group include phenoxycarbonyl group.

The term "acyl group" as used herein is meant to include substituted and unsubstituted acyl groups. The acyl group preferably has from 1 to 12 carbon atoms. Examples of the substituents on the acyl group include ionic hydrophilic groups. Examples of the acyl group include acetyl group and benzoyl group.

The term "alkoxy group" as used herein is meant to include substituted and unsubstituted alkoxy groups. The alkoxy group preferably has from 1 to 12 carbon atoms. Examples of the substituents on the alkoxy group include alkoxy groups, hydroxyl groups and ionic hydrophilic groups. Examples of the alkoxy group include methoxy group, ethoxy group, isopropoxy group, methoxyethoxy group, hydroxyethoxy group and 3-carboxypropoxy group.

The term "aryloxy group" as used herein is meant to include substituted and unsubstituted aryloxy groups. The aryoxy group preferably has from 6 to 12 carbon atoms. Examples of the substituents on the aryloxy group include. alkoxy groups, and ionic hydrophilic groups. Examples of the aryloxy group include phenoxy group, p-methoxyphenoxy group and o-methoxyphenoxy group.

The term "acyloxy group" as used herein is meant to include substituted and unsubstituted acyloxy groups. The acyloxy group preferably has from 1 to 12 carbon atoms. Examples of the substituents on the acyloxy group include ionic hydrophilic groups. Examples of the acryloxy group include acetoxy group and benzoyloxy group.

The term "carbamoyloxy group" as used herein is meant to include substituted and unsubstituted carbamoyloxy groups. Examples of the substituents on the carbamoyloxy group include alkyl groups. Examples of the carbamoyloxy group include N-methylcarbamoyloxy group.

The substituents on the amino group substituted by alkyl group, aryl group or heterocyclic group may further have substituents. These substituents include no unsubstituted amino groups. The alkylamino group is preferably an alkylamino group having 1 to 6 carbon atoms. Examples of the substituents on the alkylamino group include ionic hydrophilic groups. Examples of the alkylamino group include methylamino group and diethylamino group. The term "arylamino group" as used herein is meant to include substituted and unsubstituted arylamino groups. The arylamino group preferably has from 6 to 12 carbon atoms. Examples of the substituents on the arylamino group include halogen atoms and ionic hydrophilic groups. Examples of the arylamino group include anilino group and 2-chloroanilino group.

The term "acylamino group" as used herein is meant to include substituted acylamino groups. The acylamino group preferably has from 2 to 12 carbon atoms. Examples of the substituents on the acylamino group include ionic hydrophilic groups. Examples of the acrylamino group include acetylamino group, propionylamino group, benzoylamino group, N-phenylacetylamino group and 3,5-disulfobenzoylamino group.

The term "ureido group" as used herein is meant to include substituted and unsubstituted ureido groups. The ureido group preferably has from 1 to 12 carbon atoms. Examples of the substituents on the ureido group include alkyl group and aryl group. Examples of the ureido group include 3-methylureide group, 3,3-dimethylureide group and 3-phenylureide group.

The term "sulfamoylamino group" as used herein is meant to include substituted and unsubstituted sulfamoylamino groups. Examples of the substituents on the sulfamoylamino group include alkyl groups. Examples of the sulfamoylamino group include N,N-dipropylsulfamoylamino group.

The term "alkoxycarbonylamino group" as used herein is meant to include substituted and unsubstituted alkoxycarbonylamino groups. The alkoxycarbonylamino group preferably has from 2 to 12 carbon atoms. Examples of the substituents on the alkoxycarbonylamino group include ionic hydrophilic groups. Examples of the alkoxycarbonylamino group include ethoxycarbonylamino group.

The term "aryoxycarbonylamino group" as used herein is meant to include substituted and unsubstituted aryloxycarbonylamino groups. The aryloxycarbonylamino group preferably has from 7 to 12 carbon atoms. Examples of the substituents on the aryloxycarbonylamino group include ionic hydrophilic groups. Examples of the aryloxycarbonylamino group include phenoxycarbonylamino group.

The term "alkylsulfonylamino group and arylsulfonylamino group" as used herein is meant to include substituted and unsubstituted alkylsulfonylamino groups and substituted or unsubstituted arylsulfonylamino groups, respectively. These sulfonylamino groups each preferably has from 1 to 12 carbon atoms. Examples of the substituents on these sulfonylamino groups include ionic hydrophilic groups. Examples of these sulfonylamino groups include methanesulfonylamino group, N-phenyl-methane sulfonylamino group, benzene sulfonylamino group and 3-carboxybenzenesulfonylamino group.

The term "alkylthio group, arylthio group and heterocyclic thio group" as used herein is meant to include substituted and unsubstituted alkylthio groups, substituted and unsubstituted arylthio groups, and substituted and unsubstituted heterocyclic thio groups, respectively. The alkylthio group, arylthio group and heterocyclic thio group each preferably has from 1 to 12 carbon atoms. Examples of the substituents on the alkylthio group, arylthio group and heterocyclic thio group include ionic hydrophilic groups. Examples of the alkylthio group, arylthio group and heterocyclic thio group include methylthio group, phenylthio group and 2-pyridyl thio group.

Examples of the alkylsulfonyl group and arylsulfonyl group include methanesulfonyl group and phenylsulfonyl group, respectively.

Examples of the alkylsulfinyl group and arylsufonyl group include methanesulfonyl group and phenylsulfinyl group, respectively.

The term "sulfamoyl group" as used herein is meant to include substituted and unsubstituted sulfamoyl groups, Examples of the substituents on the sulfamoyl group include alkyl groups. Examples of the sulfamoyl group include dimethylsulfamoyl group and di-(2-hydroxyethyl)sulfamoyl group.

Referring to a preferred combination of substituents on the compound represented by the general formula (1), at least one of the various substituents is preferably a compound which is a preferred group as mentioned above. More preferably, more of the various substituents are compounds which are preferred groups as mentioned above. Most preferably, all the various substituents are compounds which are preferred groups as mentioned above.

Specific examples of the compound (azo dye) represented by the general formula (1) will be given below, but the azo dye to be used herein is not limited thereto. The carboxyl group, phosphono group and sulfo group as ionic hydrophilic groups may be used in the form of salt. Examples of the counter ion forming the salt include ammonium ion, alkaline metal ion (e.g., lithium ion, sodium ion, potassium ion), and organic cation (e.g., tetramethylammonium ion, tetramethylguanidium ion, tetramethylphosphonium ion).

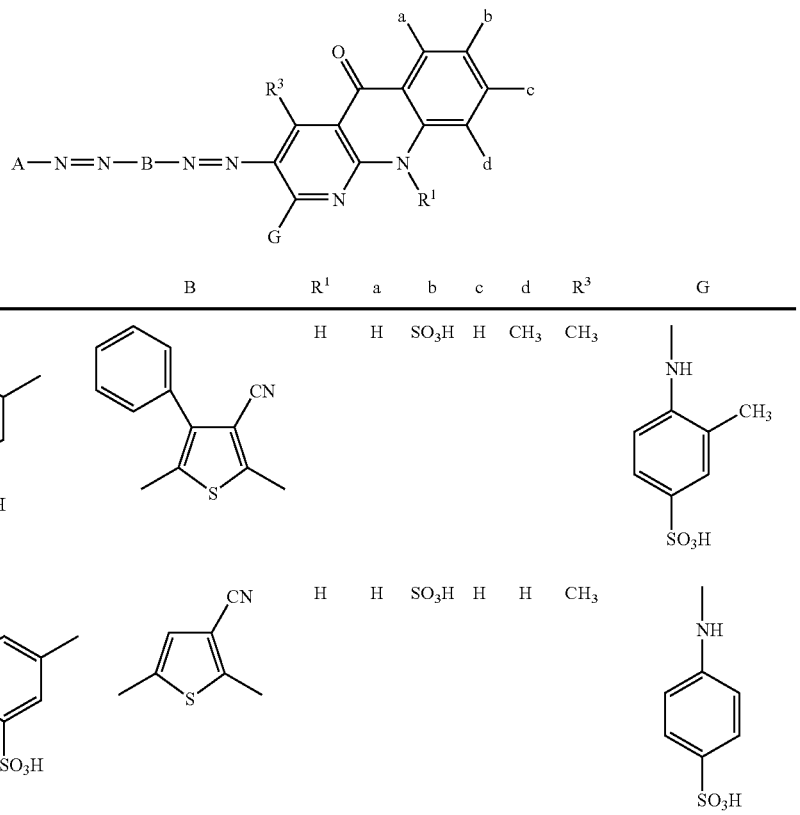

-continued

| | A | B | R¹ | a | b | c | d | R³ | G |
|---|---|---|---|---|---|---|---|---|---|
| (a-3) | 5-methylbenzene-1,3-dicarboxylic acid (HOOC, HOOC, CH₃) | 4-(pyridin-3-yl)-2,5-dimethylthiophene-3-carbonitrile | H | H | SO₃H | H | CH₃ | CH₃ | 4-(methylamino)-3-methylbenzenesulfonic acid |
| (a-4) | 7-methylnaphthalene-1,3-disulfonic acid (HO₃S, SO₃H) | 2,5-dimethyl-4-phenylthiazole | H | H | SO₃H | H | H | CH₃ | 4-(methylamino)benzenesulfonic acid |
| (a-5) | 5-methylbenzene-1,3-dicarboxylic acid (HOOC, HOOC, CH₃) | 2,5'-dimethyl-2',4-bithiazole | H | H | SO₃H | H | Cl | CH₃ | 4-(methylamino)benzenesulfonic acid |
| (b-1) | 7-methylnaphthalene-1,5-disulfonic acid (SO₃H, SO₃H) | 2,5-dimethyl-4-phenylthiophene-3-carbonitrile | H | SO₃H | H | H | CH₃ | Ph | 4-(methylamino)-3-methylbenzenesulfonic acid |
| (b-2) | 7-methylnaphthalene-1,3,5-trisulfonic acid (SO₃H, HO₃S, SO₃H) | 2,5-dimethylthiophene-3-carbonitrile | H | H | SO₃H | H | Cl | Ph | 4-(methylamino)benzenesulfonic acid |

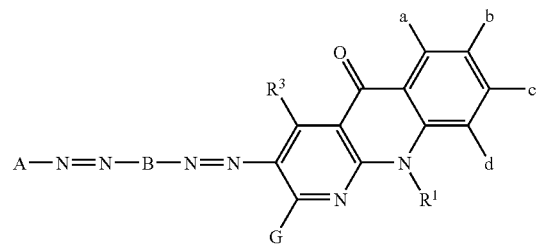

-continued

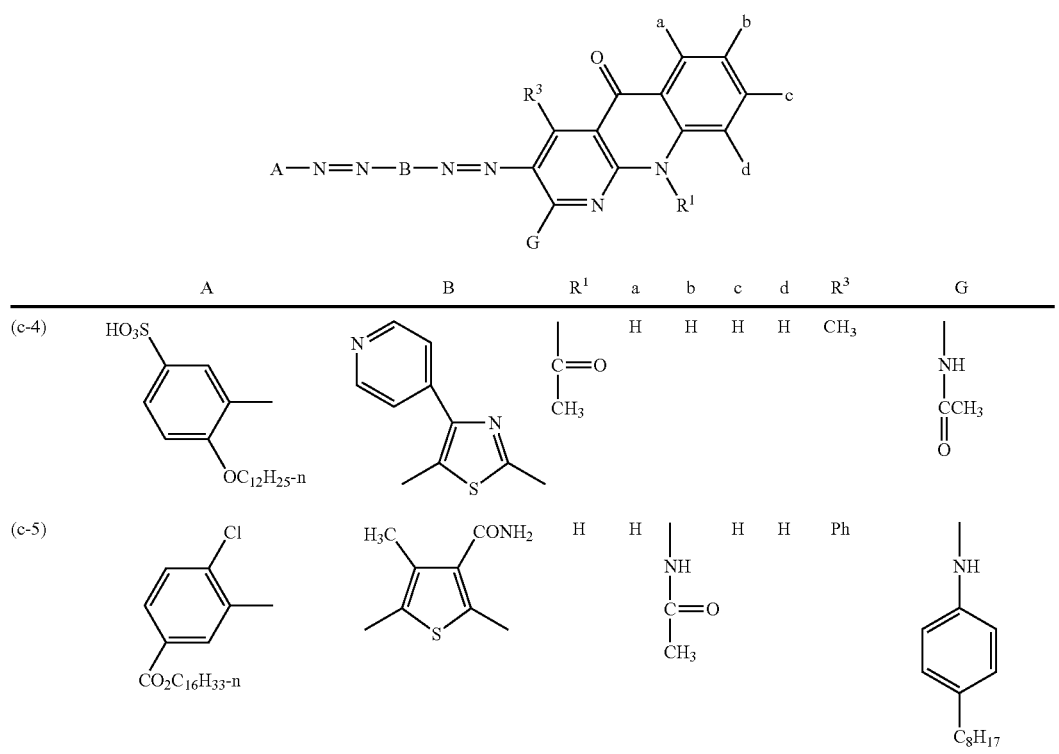

Examples of synthesis of the azo dye represented by the general formula (1) will be given below.

SYNTHESIS EXAMPLE 1

Synthesis of Dye (a-1)

<Synthesis of Intermediate Compound (b)>

16.2 g (30.4 mmol) of Compound (a), 50 g of methanesulfonic acid and 5 g of water were heated to a temperature of 150° C. with stirring for 6 hours. After the termination of reaction, the reaction solution was allowed to cool to room temperature, and then poured into a saturated saline. The resulting crude crystal was filtered, and then purified through Sephadex LH-20 gel column chromatography (produced by Pharmacia Inc.) to obtain the desired compound (b). (9.7 g; yield: 60%)

<Synthesis of Dye a-1>

6.46 mmol of a monoazo compound (1) was dispersed in a mixture of 80 ml of phosphoric acid and 40 ml of acetic acid. To the mixture was then added dropwise 1.4 ml of nitrosylsulfuric acid at an internal temperature of 2° C. After the termination of dropwise addition, the mixture was then stirred at an internal temperature of 0° C. or less for half an hour to prepare a diazo solution. 6.46 mmol of the coupler component (b) was dissolved in 160 ml of water. To the solution was then added dropwise the aforementioned diazo solution at an internal temperature of 10° C. to cause coupling. After the termination of dropwise addition, the mixture was then stirred for 1 hour. The mixture was heated to an internal temperature of 50° C. where 50 g of lithium chloride was then gradually added thereto to cause a dye to separate out. The solution was then cooled to an internal temperature of 25° C. The dye thus precipitated was withdrawn by filtration. The crude crystal thus obtained was then purified through Sephadex LH-20 gel column chromatography (produced by Pharmacia Inc.) to obtain 1.5 g of the desired dye (a-1).

Synthesis of compound (b)

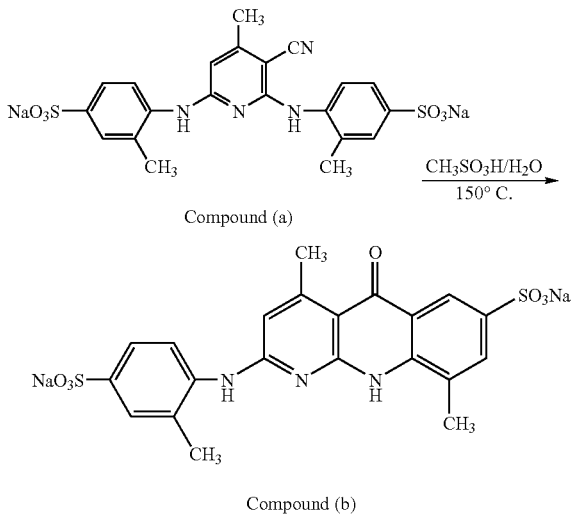

Synthesis of Dye a-1

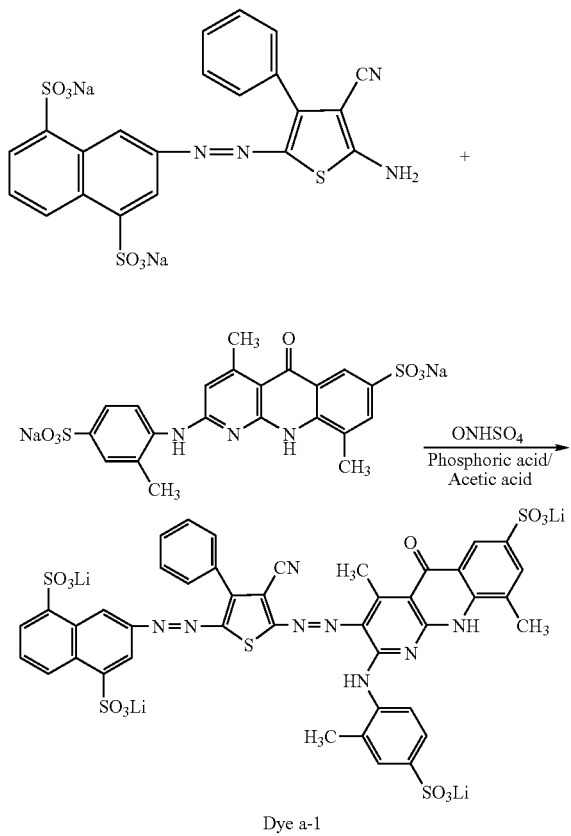

Dye a-1

The azo dye represented by the general formula (1) (hereinafter referred to as "dye of the invention") can be used in an image recording material for forming an image, particularly a color image. Specific examples of such an image recording material include ink jet recording material described in detail later, heat-sensitive recording material, pressure-sensitive recording material, recording material using electrophotography, transferring silver halide light-sensitive material, printing ink, and recording pen. Preferred among these purposes are ink jet recording material, heat-sensitive recording material, and recording material using electrophotography. Even more desirable among these purposes is ink jet recording material.

The azo dye of the invention can be used in color filter for recording and reproducing a color image in a solid imaging device such as CCD and display such as LCD and PDP and dying solution for dyeing various fibers.

The dye of the invention may be adjusted with substituents for physical properties such as solubility, dispersibility and heat transferability suitable for its purpose before use. The dye of the invention may be used in the form of solution, emulsion dispersion or solid dispersion depending on the system in which it is used.

[Ink for Ink Jet Recording]

An ink for ink jet recording can be prepared by dissolving or dispersing the aforementioned azo dye in a lipophilic medium or aqueous medium. Preferably, an aqueous medium is used. The ink for ink jet recording may comprise other additives incorporated so far as the effect of the invention is not impaired as necessary. Examples of the other additives include known additives such as drying inhibitor (wetting agent), fading inhibitor, emulsion stabilizer, penetration accelerator, ultraviolet absorber, preservative, pH adjustor, surface tension adjustor, anti-foaming agent, viscosity adjustor, dispersant, dispersion stabilizer, rust preventive and chelating agent.

The various additives are added to the ink solution, if it is water-soluble, as it is. In the case where an oil-soluble dye is used in the form of dispersion, these additives are normally added to the dispersion of dye. During preparation, these additives may be added to the oil phase or aqueous phase.

The ink for ink jet recording of the invention may comprise other dyes incorporated therein in combination with the azo dye of the invention to adjust the tone for obtaining a full-color image. Examples of dyes which can be used in combination with the azo dye of the invention will be given below.

Examples of yellow dyestuffs include aryl or heterylazo dyestuffs having phenols, naphthols, anilines, pyrazolones, pyridones or opened-chain type active methylene compounds as coupling components, azomethine dyestuffs having opened-chain type active methylene compounds as coupling components, methine dyestuffs such as benzylidene dyestuff and monomethine oxonol dyestuff, and quinone-based dyestuffs such as naphthoquinone dyestuff and anthraquinone dyestuff. Other examples of yellow dyestuffs include quinophthalone dyestuff, nitro-nitroso dyestuff, acridine dyestuff, and acridinone dyestuff. These dyestuffs may assume yellow only when chromophore is partly dissociated. In this case, the counter cation may be an inorganic cation such as alkaline metal ion and ammonium ion or an organic cation such as pyridinium ion and quaternary ammonium salt ion or may be contained in a polymer cation as a partial structure.

Examples of magenta dyestuffs include aryl or heterylazo dyestuffs having phenols, naphthols or anilines as coupling components, azomethine dyestuffs having pyrazolones or pyrazolotriazoles as coupling components, methine dyestuffs such as arylidene dyestuff, styryl dyestuff, melocyanine dyestuff and oxonol dyestuff, carbonium dyestuffs such as diphenylmethane dyestuff, triphenylmethane dyestuff and xanthene dyestuff, quinone-based dyestuffs such as naphthoquinone, anthraquinone and anthrapyridone, and condensed polycyclic dyestuffs such as dioxazine dyestuff. These dyestuffs may assume magenta only when chromophore is partly dissociated. In this case, the counter cation may be an inorganic cation such as alkaline metal ion and ammonium ion or an organic cation such as pyridinium ion and quaternary ammonium salt ion or may be contained in a polymer cation as a partial structure.

Examples of cyan dyestuff include azomethine dyestuffs such as indoaniline dyestuff and indophenol dyestuff, polymethine dyestuffs such as cyanine dyestuff, oxonol dyestuff and melocyanine dyestuff, carbonium dyestuffs such as diphenylmethane dyestuff, triphenylmethane dyestuff and xanthene dyestuff, phthalocyanine dyestuffs, anthraquinone dyestuffs, aryl or heterylazo dyestuffs having phenols, naphthols or anilines as coupling components, and indigo-thioindigo dyestuffs. These dyestuffs may assume cyan only when chromophore is partly dissociated. In this case, the counter cation may be an inorganic cation such as alkaline metal ion and ammonium ion or an organic cation such as pyridinium ion and quaternary ammonium salt ion or may be contained in a polymer cation as a partial structure.

Alternatively, a black dye such as polyazo dye or a carbon black dispersion may be used.

Further, water-soluble dyes such as direct dye, acidic dye, food dye, basic dye and reactive dye can be used in combination with the azo dye of the invention.

Preferred examples of these water-soluble dyes include:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, 247;

C.I. Direct Violet 7, 9, 47, 48, 51, 66, 90, 93, 94, 95, 98, 100, 101;

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163;

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291;

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199;

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397;

C.I. Acid Violet 5, 34, 43, 47, 48, 90, 103, 126;

C.I. Acid yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227;

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326;

C.I. Acid Black 7, 24, 29, 48, 52 1, 172;

C.I. Reactive Red 3, 13, 17, 19, 21, 22, 23, 24, 29, 35, 37, 40, 41, 43, 45, 49, 55;

C.I. Reactive Violet 1, 3, 4, 5, 6, 7, 8, 9, 16, 17, 22, 23, 24, 26, 27, 33, 34;

C.I. Reactive Yellow 2, 3, 13, 14, 15, 17, 18, 23, 24, 25, 26, 27, 29, 35, 37, 41, 42;

C.I. Reactive Blue 2, 3, 5, 8, 10, 13, 14, 15, 17, 18, 19, 21, 25, 26, 27, 28, 29, 38;

C.I. Reactive Black 4, 5, 8, 14, 21, 23, 26, 31, 32, 34;

C.I. Basic Red 12, 13, 14, 15, 18, 22, 23, 24, 25, 27, 29, 35, 36, 38, 39, 45, 46;

C.I. Basic Violet 1, 2, 3, 7, 10, 15, 16, 20, 21, 25, 27, 28, 35, 37, 39, 40, 48;

C.I. Basic Yellow 1, 2, 4, 11, 13, 14, 15, 19, 21, 23, 24, 25, 28, 29, 32, 36, 39, 40;

C.I. Basic Blue 1, 3, 5, 7, 9, 22, 26, 41, 45, 46, 47, 54, 57, 60, 62, 65, 66, 69, 71;

C.I. Basic Black 8, etc.

Further, the ink composition of the present invention may comprise pigments incorporated therein as well.

As the pigments to be used in the ink for ink jet recording of the present invention there may be used commercially available products as well as known compounds listed in various literatures. Examples of these literatures include Color Index (compiled by The Society of Dyers and Colourists), "Kaitei Shinban Ganryo Binran (Revised Edition of Handbook of Pigments)", compiled by Japan Association of Pigment Technology, 1989, "Saishin Ganryo Ouyou Gijutsu (Modern Applied Technology of Pigments)", CMC, 1986, "Insatsu Inki Gijutsu (Printing Ink Technology)", CMC, 1984, and W. Herbst, K. Hunger, "Industrial Organic Pigments", VCH Verlagsgesellschaft, 1993. Specific examples of these pigments include organic pigments such as azo pigment (e.g., azo lake pigment, insoluble azo pigment, condensed azo pigment, chelate azo pigment), polycyclic pigment (e.g., phthalocyanine pigment, anthraquinone-based pigment, perylene-based pigment, perynone-based pigment, indigo-based pigment, quinacridone-based pigment, dioxazine-based pigment, isoindolinone-based pigment, quinophthalone-based pigment, diketopypyrrolopyrrole-based pigment), dyed lake pigment (e.g., acidic or basic dye lake pigment) and azine pigment, and inorganic pigments such as yellow pigment (e.g., C.I. Pigment Yellow 34, 37, 42, 53), red pigment (e.g., C.I. Pigment Red 101, 108), blue pigment (e.g., C.I. Pigment blue 27, 29, 17: 1), black pigment (e.g., C.I. Pigment Black 7, magnetite) and white pigment (e.g., C.I. Pigment White 4, 6, 18, 21).

As a pigment having a color tone suitable for image formation there is preferably used a blue or cyan pigment such as phthalocyanine pigment, anthraquinone-based indanthrone pigment (e.g., C.I. Pigment Blue 60) and dyed lake pigment-based triarylcarbonium pigment, particularly phthalocyanine pigment (Preferred examples of the phthalocyanine pigment include copper phthalocyanine such as C.I. Pigment Blue 15:1, 15:2, 15:3, 15:4 and 15:6, monochlorophthalocyanine, low chlorination copper phthalocyanine, aluminum phthalocyanine such as pigment listed in European Patent 860475, metal-free phthalocyanine such as C.I. Pigment Blue 16, and phthalocyanine having Zn, Ni or Ti as a central metal. Particularly preferred among these phthalocyanine dyes are C.I. Pigment Blue 15:3, 15:4, and aluminum phthalocyanine).

Preferred examples of red or purple pigments include azo pigments (Preferred examples of these dyes include C.I. Pigment Red 3, 5, 11, 22, 38, 48:1, 48:2, 48:3, 48:4, 49:1, 52:1, 53:1, 57:1,63:2, 144, 146, 184. Particularly preferred among these dyes are C.I. Pigment Red 57:1, 146, 184), quinacridone-based pigments (Preferred examples of these dyes include C.I. Pigment Red 122, 192, 202, 207, 209, and C.I. Pigment Violet 19, 42. Particularly preferred among these dyes is C.I. Pigment Red 122), dyed lake-based triarylcarbonium pigments (Preferred examples of these dyes include xanthene-based C.I. Pigment Red 81:1, C.I. Pigment Violet 1, 2, 3, 27, 39), dioxazine-based pigments (e.g., C.I. Pigment Violet 23, 37), diketopyrrolopyrrole-based pigments (e.g., C.I. Pigment Red 254), perylene pigments (e.g., C.I. Pigment Violet 29), anthraquinone-based pigments (e.g., C.I. Pigment Violet 5:1, 31, 33), and thioindigo-based pigments (e.g., C.I. Pigment Red 38, 88).

Preferred examples of yellow pigments include azo pigments (Preferred examples of these dyes include monoazo pigment-based dyes such as C.I. Pigment Yellow 1, 3, 74, 98, disazo pigment-based dyes such as C.I. Pigment Yellow 12, 13, 14, 16, 17, 83, general azo-based dyes such as C.I. Pigment Yellow 93, 94, 95, 128, 155 and benzimidazolone-based dyes such as C.I. Pigment Yellow 120, 151, 154, 156, 180. Particularly preferred among these dyes are those prepared from materials other than benzidine-based compounds), isoindoline-isoindolinone-based pigments (Preferred examples of these dyes include C.I. Pigment Yellow 109, 110, 137, 139), quinophthalone pigments (Preferred examples of these dyes include C.I. Pigment Yellow 138), and flavanthrone pigment (e.g., C.I. Pigment Yellow 24).

Preferred examples of black pigments include inorganic pigments (Preferred examples of these pigments include carbon black, and magnetite), and aniline black.

Besides these pigments, orange pigments(C.I. Pigment Orange 13, 16), and green pigments (C.I. Pigment Green 7) may be used.

The pigments which may be used in the ink of the invention may be untreated pigments as mentioned above or may be surface-treated pigments. As surface treatment methods there may be proposed a method involving surface coat with a resin or wax, a method involving the attachment of a surface activator, a method involving the bonding of a reactive material (e.g., silane coupling agent, radical produced from an epoxy compound, polyisocyanate or diazonium salt) to the surface of pigment, etc., and these methods are described in the following literatures and patents.

(1) Kinzoku Sekken no Seishitsu to Ouyou (Properties and Application of Metal Soap) (Saiwai Shobo)

(2) Insatsu Inki Insatsu (Printing with Printing Ink) (CMC Shuppan, 1984)

(3) Saishin Ganryo Ouyou Gijutsu (Modern Applied Technology of Pigments (CMC, 1986)

(4) U.S. Pat. Nos. 5,554,739, 5,571,311

(5) JP-A-9-151342, JP-A-10-140065, J?-A-10-292143, JP-A-11-166145

In particular, self-dispersible pigments prepared by reacting the diazonium salt disclosed in the U.S. patents (4) with carbon black and capsulized pigments prepared according to the method disclosed in the Japanese patents (5) are useful to obtain dispersion stability without using extra dispersant in the ink.

In the ink of the invention, the pigment may be further dispersed with a dispersant. As such a dispersant there may be used any of known compounds depending on the pigment used, e.g., surface active agent type low molecular dispersant or polymer type dispersant. Examples of these dispersants include those disclosed in JP-A-3-69949 and European Patent 549,486. In order to accelerate the adsorption of the pigment to the dispersant used, a pigment derivative called synergist may be added.

The particle diameter of the pigment which may be used in the ink of the invention is preferably from 0.01 μm to 10 μm, more preferably from 0.05 μm to 1 μm.

As a method for dispersing the pigment there may be used a known dispersion technique for use in the production of ink or toner. Examples of the dispersing machine include vertical or horizontal agitator mill, attritor, colloid mill, ball mill, three-roll mill, pearl mill, super mill, impeller, disperser, KD mill, dynatron, and pressure kneader. The details of these dispersing machines are described in "Saishin Ganryo Ouyou Gijutsu (Modern Applied Technology of Pigments)", CMC, 1986.

The surface active agent which can be incorporated in the ink for ink jet recording of the invention will be described hereinafter.

A surface active agent can be incorporated in the ink for ink jet recording of the invention to adjust the liquid physical properties of the ink, making it possible to provide the ink with an enhanced ejection stability and hence excellent effects such as enhanced water resistance of image and prevention of bleeding of ink printed.

Examples of the surface active agent include anionic surface active agents such as sodium dodecylsulfate, sodium dodecyloxysulfonate and sodium alkylbenzenesulfonate, cationic surface active agents such as cetyl pyridinium chloride, trimethyl cetyl ammonium chloride and tetrabutyl ammonium chloride, and nonionic surface active agents such as polyoxyethylene nonyl phenyl ether, polyoxyethylene naphthyl ether and polyoxy ethylene octyl phenyl ether. Particularly preferred among these surface active agents are nonionic surface active agents.

The content of the surface active agent is from 0.001% to 15% by weight, preferably from 0.005% to 10% by weight, more preferably from 0.01% to 5% by weight based on the amount of the ink.

The ink for ink jet recording of the invention can be prepared by dissolving and/or dispersing the aforementioned dye and optionally a surface active agent in an aqueous medium. The term "aqueous medium" as used herein is meant to indicate water or a mixture of water and a water-miscible organic solvent optionally comprising additives such as wetting agent, stabilizer and preservative incorporated therein.

In order to prepare the ink solution of the invention, if it is water-soluble, these components are preferably dissolved in water. Thereafter, various solvents and additives are added to the solution. The mixture is then subjected to dissolution and stirring to make a uniform ink solution.

During this procedure, dissolution is accomplished by any of various methods such as agitation, irradiation with ultrasonic wave and shaking. Particularly preferred among these methods is agitation. The agitation, if effected, is accomplished by any of various methods such as fluid agitation and agitation utilizing shearing force developed by contrarotating agitator or dissolver known in the art. On the other hand, agitation utilizing shearing force with respect to the bottom of container as developed by a magnetic agitator is preferably used.

Examples of the water-miscible organic solvent employable herein include alcohols (e.g., methanol, ethanol, propanol, isopropanol, butanol, isobutanol, sec-butanol, t-butanol, pentanol, hexanol, cyclohexanol, benzyl alcohol), polyvalent alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycolderivatives (e.g., ethyleneglycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyl diethanolamine, morpholine, N-ethylmorpholine, ethylene diamine, diethylene triamine, triethylene tetramine, polyethyleneimine, tetramethylpropylene diamine), and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone) Two or more of the water-miscible organic solvents may be used in combination.

The aforementioned azo dye, if it is oil-soluble, may be emulsion-dispersed in an aqueous medium in the form of solution in a high boiling organic solvent.

The boiling point of the high boiling organic solvent to be used in the invention is not lower than 150° C., preferably not lower than 170° C.

Examples of the high boiling organic solvent employable herein include phthalic acid esters (e.g., dibutyl phthalate, dioctyl phthalate, dicyclohexyl phthalate, di-2-ethylhexyl phthalate, decyl phthalate, bis(2,4-di-tert-amylphenyl)

isophthalate, bis(1,1-diethylpropyl)phthalate), phosphoric or phosphonic acid esters (e.g., diphenyl phosphate, triphenyl phosphate, tricresyl phosphate, 2-ethylhexyl diphenyl phosphate, dioctyl butyl phosphate, tricyclohexyl phosphate, tri-2-ethylhexyl phosphate, tridodecyl phosphate, di-2-ethylhexyl phenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecaneamide, N,N-diethyllaurylaraide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tert-octylaniline), chlorinated paraffins (e.g., paraffins having a chlorine content of from 10% to 80%), trimesic acid esters (e.g., tributyl trimesate), dodecyl benzene, diisopropylene naphthalene, phenols (e.g., 2,4-di-tert-amylphenol, 4-dodecyloxyphenol, 4-dodecyloxycarbonylphenol, 4-(4-dodecyloxy phenyl sulfonyl)phenol), carboxylic acids (e.g., 2-(2,4-di-tert-amylphenoxybutyric acid, 2-ethoxy octanedecanoic acid), and alkylphosphoric acids (e.g., di-2(ethylhexyl)phosphoric acid, dipheylphosphoric acid) The high boiling organic solvent may be used in an amount of from 0.01 to 3 times, preferably from 0.01 to 1.0 times that of the oil-soluble dye by weight.

These high boiling organic solvents may be used singly or in admixture of two or more thereof (e.g., tricresyl phosphate and dibutyl phthalate, trioctyl phosphate and di(2-ethylhexyl)sebacate, dibutyl phthalate and poly(N-t-butylacrylamide)).

For examples of compounds other than the aforementioned high boiling organic solvents to be used in the invention and/or methods for the synthesis of these high boiling organic solvents, reference can be made to U.S. Pat. Nos. 2,322,027, 2,533, 514, 2,772,163, 2,835,579, 3,594, 171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464, 464, 4,483,918, 4,540,657, 4,684,606, 4,728,599, 4,745,049, 4,935,321, 5,013,639, European Patents 276, 319A, 286,253A, 289,820A, 309,158A, 309,159A, 309, 160A, 509,311A, 510,576A, East German Patents 147,009, 157,147, 159,573, 225,240A, British Patent 2,091, 124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946, and JP-A-4-346338.

The aforementioned high boiling organic solvents are used in an amount of from 0.01 to 3.0 times, preferably from 0.01 to 1.0 times that of the oil-soluble dye by weight.

In the invention, the oil-soluble dye and the high boiling organic solvent are used in the form of emulsion dispersion in an aqueous medium. During emulsion dispersion, a low boiling organic solvent may be used in some cases from the standpoint of emulsifiability. As such a low boiling organic solvent there may be used an organic solvent having a boiling point of from about 30° C. or more to 150° C. or less at atmospheric pressure. Preferred examples of the organic solvent employable herein include esters (e.g., ethyl acetate, butyl acetate, ethyl propionate, β-ethoxyethyl acetate, methyl cellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone), and ethers (e.g., tetrahydrofurane, dioxane) However, the invention is not limited to these organic solvents.

The emulsion dispersion is effected to disperse an oil phase having a dye dissolved in a high boiling organic solvent optionally mixed with a low boiling organic solvent in an aqueous phase mainly composed of water to make minute oil droplets of oil phase. During this procedure, additives such as surface active agent, wetting agent, dye stabilizer, emulsion stabilizer, preservative and antifungal agent described later may be added to either or both of the aqueous phase and the oil phase as necessary.

The emulsification is normally accomplished by adding the oil phase to the aqueous phase. Alternatively, a so-called emulsification method involving the dropwise addition of an aqueous phase to an oil phase is preferably used. Also in the case where the azo dye to be used in the invention is water-soluble and the additives are oil-soluble, the aforementioned emulsification method may be used.

The emulsion dispersion may be effected with various surface active agents. Preferred examples of the surface active agents employable herein include anionic surface active agents such as aliphatic acid salt, alkylsulfuric acid ester salt, alkylbenzenesulfonate salt, alkylnaphthalenesulfonate salt, dialkylsulfosuccinate salt, alkylphosphoric acid esters salt, naphthalenesulfonic acid-formalin condensate and polyoxyethylenealkyl sulfuric acid ester salt, and nonionic surface active agents such as polyoxyethylenealkyl ether, polyoxyethylene alkylallyl ether, polyoxyethylenealiphatic acid ester, sorbitanaliphatic acid ester, polyoxyethylene sorbitanaliphatic acid ester, polyoxyethylenealkyl amine, glycerinaliohatic acid ester and oxyethylene oxypropylene block copolymer. Alternatively, SURFYNOLS (produced by Air Products & Chemicals Inc.), which are acetylene-based polyoxyethylene oxide surface active agents, are preferably used as well. Further, amine oxide-based amphoteric surface active agents such as N,N-dimethyl-N-alkylamine oxide may be used. Those listed as surface active agents in JP-A-59-157,636, pp. 37 to 38, and Research Disclosure No. 308119 (1989) may be used.

For the purpose of stabilizing the ink shortly after emulsification, the aforementioned surface active agents may be used in combination with a water-soluble polymer. As such a water-soluble polymer there may be preferably used a polyvinyl alcohol, polyvinyl pyrrolidone, polyethylene oxide, polyacrylic acid, polyacrylamide or copolymer thereof. Further, natural water-soluble polymers such as polysaccharides, casein and gelatin may be preferably used. For the purpose of stabilizing the dye dispersion, polyvinyls obtained by the polymerization of acrylic acid esters, methacrylic acid esters, vinyl esters, acrylamides, methacrylamides, olefins, styrenes, vinylethers or acrylonitriles, polyurethanes, polyesters, polyamides, polyureas, polycarbonates, etc., which are substantially insoluble in an aqueous medium, may be used. These polymers preferably have $-SO_3^-$ or $-COO^-$. In the case where these polymers substantially insoluble in an aqueous medium are used, they are preferably used in an amount of not greater than 20% by weight, preferably not greater than 10% by weight based on the amount of the high boiling organic solvent.

In the case where emulsion dispersion is effected to disperse the oil-soluble dye or high boiling organic solvent to make an aqueous ink, a particularly important factor is control over the particle size of the aqueous ink. In order to enhance the color purity or density during the formation of an image by ink ejection, it is essential to reduce the average particle size The volume-average particle diameter of the aqueous ink is preferably not greater than 1 µm, more preferably from 5 nm to 100 nm The measurement of the volume-average particle diameter and the particle size distribution of the dispersed particles can be easily accomplished by any known method such as static light scattering method, dynamic light scattering method, centrifugal sedimentation method and method as disclosed in "Jikken Kagaku Koza (Institute of Experimental Chemistry)", 4th ed., pp. 417 to 418. For example, measurement can be easily carried out by diluting the ink with distilled water such that the particle concentration in the ink reaches 0.1% to 1% by weight, and then subjecting the solution to measurement using a commercially available volume-average particle diameter measuring instrument (e.g., Microtrack UPA (produced by NIKKISO CO., LTD.). Further, dynamic light scattering method utilizing laser doppler effect is particularly preferred because it is capable of measuring even small particle size.

The term "volume-average particle diameter" as used herein is meant to indicate average particle diameter weighted with particle volume, which is obtained by dividing the sum of the product of the diameter and the volume of individual particles in the aggregate of particles by the total volume of the particles. For the details of volume-average particle diameter, reference can be made to Souichi. Muroi, "Koubunshi Ratekkusu no Kagaku (Chemistry of Polymer Letexes)", Koubunshi Kankokai, page 119.

It was also made obvious that the presence of coarse particles has an extremely great effect on the printing properties. In other words, coarse particles clog the head nozzle. Even if coarse particles don't go so far as to clog the head nozzle, the ink cannot be ejected or can be deviated when ejected, giving a serious effect on the printing properties. In order to prevent this trouble, it is important to keep the number of particles having a diameter of not smaller than 5 µm and not smaller than 1 µm in 1 µl of the resulting ink to 10 or less and 1,000 or less, respectively.

The removal of these coarse particles can be accomplished by any known method such as centrifugal separation method and precision filtration method. The separation step may be effected shortly after emulsion dispersion or shortly before the filling of the emulsion dispersion comprising various additives such as wetting agent and surface active agent in the ink cartridge.

As an effective unit for reducing the average particle diameter of particles and eliminating coarse particles there may be used a mechanical emulsifier.

As such an emulsifier there may be used any known device such as simple stirrer, impeller type agitator, in-line agitator, mill type agitator (e.g., colloid mill) and ultrasonic agitator. The use of a high pressure homogenizer is particularly preferred.

For the details of the mechanism of high pressure homogenizer, reference can be made to U.S. Pat. No. 4,533,254, JP-A-6-47264, etc. Examples of commercially available high pressure homogenizers include Gaulin homogenizer (produced by A. P. V GAULLN INC.), microfluidizer (produced by MICROFLUIDEX INC.) and altimizer (produced by SUGINO MACHINE LIMITED).

In recent years, a high pressure homogenizer having a mechanism for atomizing a material in a ultrahigh pressure jet stream as disclosed in U.S. Pat. No. 5,720,551 is particularly useful in the emulsion dispersion of the invention. An example of the emulsifier using a ultra high jet stream is De BEE2000 (produced by BEE INTERNATIONAL LTD.).

The pressure at which emulsion is carried out by a high pressure emulsion disperser is not lower than 50 MPa, preferably not lower than 60 MPa, more preferably not lower than 180 MPa.

For example, the combined use of two or more emulsifiers as in a method involving the emulsification by an agitated emulsifier followed by the passage through a high pressure homogenizer is particularly preferred. Alternatively, a method is preferably used which comprises effecting the emulsion of the material using such an emulsifier, adding additives such as wetting agent and surface active agent, and then passing the ink composition again through the high pressure homogenizer before being filled in the cartridge.

In the case where the dye composition comprises a low boiling organic solvent incorporated therein in addition to the high boiling organic solvent, it is preferred to remove the low boiling organic solvent from the standpoint of emulsion stability and safety/hygiene. The removal of the low boiling solvent can be accomplished by any known method such as evaporation method, vacuum evaporation method and ultra-filtration method depending on the solvent to be removed. The step of removing the low boiling organic solvent is preferably effected as rapidly as possible shortly after emulsification.

For the details of the method for the preparation of the ink for ink jet recording, reference can be made to JP-A-5-148436, JP-A-5-295312, JP-A-7-97541, JP-A-7-82515 and JP-A-7-118584. These methods can apply also to the preparation of the ink to be incorporated in the ink set for ink jet recording according to the invention.

The ink for ink jet recording obtained according to the invention may comprise properly selected additives incorporated therein in a proper amount such as drying inhibitor for preventing the clogging of the ejection nozzle with dried ink, penetration accelerator for helping the ink to penetrate in the page, ultraviolet absorber, oxidation inhibitor, viscosity adjustor, surface tension adjustor, dispersant, dispersion stabilizer, antifungal agent, rust preventive, pH adjustor, anti-foaming agent and chelating agent.

As the drying inhibitor to be used herein there is preferably used a water-soluble organic solvent having a lower vapor pressure than water. Specific examples of the water-soluble organic solvent include polyvalent alcohols such as ethylene glycol, propylene glycol, diethylene glycol, polyethylene glycol, thiodiglycol, dithiodigycol, 2-methyl-1,3-propanediol, 1,2,6-hexanetriol, acetylene glycol derivative, glycerin and trimethylolpropane, lower alkylethers of polyvalent alcohol such as ethylene glycol monomethyl (or ethyl) ether, diethylene glycol monomethyl(or ethyl)ether and triethylene glycol monoethyl(or butyl)ether, heterocyclic compounds such as 2-pyrrolidone, N-methyl-2-pyrrolidone, 1,3-dimethyl-2-imidazolidinone and N-ethylmorpholine, sulfur-containing compounds such as sulfolane, dimethylsulfoxide and 3-sulfolene, polyfunctional compounds such as diacetone alcohol and diethanolamine, and urea derivatives. Preferred among these water-soluble organic solvents are polyvalent alcohols such as glycerin and diethylene glycol. These drying inhibitors may be used singly or in combination of two or more thereof. These drying inhibitors are preferably incorporated in the ink in an amount of from 10% to 50% by weight.

Examples of the penetration accelerator employable herein include alcohols such as ethanol, isopropanol, butanol, di(tri)ethylene glycol monobutyl ether and. 1,2- hexanediol, sodium laurylsulfate, sodium oleate, and nonionic surface active agents. These penetration accelerators can exert a sufficient effect when incorporated in the ink in an amount of from 10% to 30% by weight. These penetration accelerators are preferably used in an amount such that no printing run or print through occurs.

Examples of the ultraviolet absorber to be used to enhance the preservability of the image in the invention include benzotriazole-based compounds as disclosed in JP-A-58-185677, JP-A-61-190537, JP-A-2-782, JP-A-5-197075 and JP-A-9-34057, benzophenone-based compounds as disclosed in JP-A-46-2784, JP-A-5-194483 and U.S. Pat. No. 3,214,463, cinnamic acid-based compounds as disclosed in JP-B-48-30492, JP-A-56-21141 and JP-A-10-88106, triazine-based compounds as disclosed in JP-A-4-298503, JP-A-8-53427, JP-A-8-239368, JP-A-10-182621 and JP-T-8-501291, compounds as disclosed in Research Disclosure No. 24239, and compounds which absorb ultraviolet rays to emit fluorescence, i.e., so-called fluorescent brighteners, such as stilbene-based and benzoxazole-based compounds.

In the invention, as the oxidation inhibitor to be used to enhance the image preservability there may be used any of various organic and metal complex-based discoloration inhibitors. Examples of the organic discoloration inhibitors include hydroquinones, alkoxyphenols, dialkoxyphenols, phenols, anilines, amines, indanes, chromans, alkoxyanilines, and heterocyclic compounds. Examples of the metal complex-based discoloration inhibitors include nickel complex, and zinc complex. Specific examples of these oxidation inhibitors include compounds listed in the patents cited in Research Disclosure No. 17643, Articles VII-I and J, Research Disclosure No. 15162, Research Disclosure No. 18716, left column, page 650, Research Disclosure No. 36544, page 527, Research Disclosure No. 307105, page 872, and Research Disclosure No. 15162, and compounds included in the general formula and examples of representative compounds listed in JP-A-62-215272, pp. 127 to 137.

Examples of the antifungal agent employable herein include sodium dehydroacetate, sodium benzoate, sodium pyridinethione-1-oxide, ethyl p-hydroxybenzoate, 1,2-benzoisothiazoline-3-one, and salts thereof. These antifungal agents are preferably incorporated in the ink in an amount of from 0.02% to 5.00% by weight.

For the details of these antifungal agents, reference can be made to "Bokin Bobizai Jiten (Dictionary of Anti-bacterial and Antifungal Agents")", compiled by Dictionary Compilation Committee of The Society for Antibacterial and Antifungal Agents, Japan.

Examples of the rust preventive employable herein include acidic sulfites, sodium thiosulfate, ammonium thioglycolate, diisopropylammonium nitrite, pentaerthyritol tetranitrate, dicyclohexylammonium nitrite, and benzotriazole. These rust preventives are preferably incorporated in the ink in an amount of from 0.02% to 5.00% by weight.

The pH adjustor to be used in the invention is preferably used for the purpose of adjusting the pH value of the ink, providing dispersion stability or like purposes. It is preferred that the pH value of the ink be adjusted to a range of from 8 to 11 at 25° C. from the stand point of preventing nozzle clogging and water resistance. Examples of the pH adjustor include basic pH adjustors such as organic base and inorganic alkali, and acidic pH adjustors such as organic acid and inorganic acid.

Examples of the basic compounds employable herein include inorganic compounds such as sodium hydroxide, potassium hydroxide, sodium carbonate, potassium carbonate, sodium hydrogencarbonate, potassium hydrogencarbonate, sodium acetate, potassium acetate, sodium phosphate and sodium monohydrogenphosphate, and organic base such as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine and collidine.

Examples of the acidic compounds employable herein include inorganic compounds such as hydrochloric acid, sulfuric acid, phosphoric acid, boric acid, sodium hydrogensulfate, potassium hydrogensulfate, potassium dihydrogenphosphate and sodium dihydrogenphosphate, and organic compounds such as acetic acid, tartaric acid, benzoic acid, trifluoroacetic acid, methanesulfonic acid, ethanesulfonic acid, benzenesulfonic acid, p-toluenesulfonic acid, saccharinic acid, phthalic acid, picolic acid and quinolinic acid.

The ink of the invention has an electric conductance of from 0.01 to 10 S/m. The preferred electric conductance of the ink ranges from 0.05 to 5 S/m.

The measurement of electric conductance can be accomplished by en electrode method using a commercially available saturated potassium chloride.

The electric conductance of the inks can be controlled mainly by the ionic concentration of the aqueous solution. In the case where the salt concentration is high, desalting may be effected using a ultrafiltration membrane or the like. Further, in the case where salts or the like are added to adjust electric conductance, various organic or inorganic salts may be added.

Examples of the inorganic salts employable herein include potassium halide, sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium monohydrogenphosphate, boric acid, potassium dihydrogenphosphate and sodium dihydrogenphosphate. Examples of the organic salts employable herein include organic compounds such as sodium acetate, potassium acetate, potassium tartrate, sodium tartrate, sodium benzoate, potassium benzoate, sodium p-toluenesulfonate, potassium saccharinate, potassium phthalate and sodium picolate.

Alternatively, the selection of the aqueous media listed below makes it possible to adjust the electric conductance of the inks.

The ink of the invention preferably exhibits a viscosity of 30 mPa·s or less, more preferably from 1 to 20 mPa·s, even more preferably from 2 to 15 mPa·s, particularly preferably from 2 to 10 mPa·s at 25° C. from the standpoint of fixing rate of image and ejectability and for the purpose of preventing running of recorded image to keep high image quality.

The adjustment of viscosity can be arbitrarily carried out by controlling the added amount of the ink solvent. Examples of the ink solvent employable herein include glycerin, diethylene glycol, triethanolamine, 2-pyrrolidone, diethylene glycol monobutyl ether, and triethylene glycol monobutyl ether.

Further, a viscosity adjustor may be used. Examples of the viscosity adjustor employable herein include celluloses, water-soluble polymers such as polyvinyl alcohol, and nonionic surface active agents. For the details of these viscosity adjustors, reference can be made to "Nendo Chousei Gijutsu (Technology for Viscosity Adjustment)", Gijutsu Joho Kyoukai, Article 9, 1999, and "Inku Jetto Purintayou Kemikaruzu (98 zouho)—Zairyou no Kaihatsu Doko/Tenbo Chousa (Chemicals for Ink Jet Printer (98 enlarged edition)—Research on Trend and View of Development of Materials)", CMC, pp. 162 to 174, 1997.

For the details of the method for the measurement of viscosity of liquid, reference can be made to JIS Z8803. In practice, however, the viscosity of liquid can be simply measured using a commercially available viscometer. Examples of the rotary viscometer include Type B viscometer and Type E viscometer produced by Tokyo Keiki Kogyo K.K. In the invention, a Type VM-100a-L vibration viscometer (produced by YAMAICHI ELECTRONICS CO., LTD.) was used to measure viscosity at 25° C. The unit of viscosity is Pa·s. In practice, however, mPa·s is used.

The surface tension, regardless of which it is static or dynamic, of the ink to be used in the invention is preferably from 20 to not greater than 60 mN/m, more preferably from 20 to not greater than 45 mN/m at 25° C. When the surface tension of the ink falls within the above defined range, the resulting ink exhibits a drastic improvement in print quality such as ejection stability and resistance to running and whisker during color mixing. Further, the resulting ink can be fairly attached to the surface of a hard object, making it possible to further prevent the occurrence of defective printing.

Various cationic, anionic and nonionic surface active agents may be added for the purpose of adjusting surface tension. These surface active agents are preferably used in an amount of from 0.01 to 20% by weight, more preferably from 0.1 to 10% by weight based the weight of the ink for ink jet recording. Two or more of these surface active agents may be used in combination.

Known examples of the static surface tension measuring method include capillary rise method, dropping method, and ring method. In the invention, as the static surface tension measuring method there is used a perpendicular plate method.

When a thin glass or platinum plate is hanged partially dipped in a liquid, surface tension of the liquid acts downward along the length of the plate in contact with the liquid. The surface tension is measured by balancing this force by a upward force.

As dynamic surface tension measuring methods there are known vibration jet method, meniscus dropping method and maximum bubble pressure method as disclosed in "Shin-jikken Kagaku Koza (New Institute of Experimental Chemistry), 18th ed., Kaimen to Koroido (Interface and Colloid)", Maruzen, pp. 69 to 90 (1977). Further, a liquid film destruction method is known as disclosed in JP-A-3-2064. In the invention, as the dynamic viscosity measuring method there is used a differential bubble pressure method. The principle and method of effecting this measuring method will be described hereinafter.

When bubbles are formed in a solution which has been stirred to uniformity, a new gas-liquid interface is produced. Surface active agent molecules in the solution then gather on the surface of water at a constant rate. The bubble rate (rate of formation of bubbles) is changed. As the formation rate decreases, more surface active agent components gather on the surface of bubbles, reducing the maximum bubble pressure shortly before the burst of bubbles. Thus, the maximum bubble pressure (surface tension) with respect to bubble rate can be detected. As a method for the measurement of dynamic surface tension there is preferably used a method which comprises forming bubbles in a solution using a large probe and a small probe, measuring the differential pressure of the two probes in the state of maximum bubble pressure, and then calculating the dynamic surface tension from the differential pressure.

The content of no-volatile components in the ink of the invention is preferably from 10% to 70% by weight based on the total amount of the ink from the standpoint of enhancement of ejection stability of ink, printed image quality and various fastnesses of image and elimination of running of printed image and stickiness of printed surface, more preferably from 20% to 60% by weight from the standpoint of enhancement of ejection stability of ink and elimination of running of printed image.

The term "non-volatile component" as used herein is meant to indicate a liquid, solid or polymer component having a boiling point of not lower than 150° C. at 1 atm. Examples of the non-volatile components to be incorporated in the ink for ink jet recording include dyes, and high boiling solvents, and polymer latexes, surface active agents, dye stabilizers, antifungal agents and buffers which are optically added. Most of these non-volatile components but dye stabilizers deteriorate the dispersion stability of the ink. Further, these non-volatile components are still present on the ink jet image-receiving paper after printing, inhibiting the stabilization of dyes by association on the image-receiving paper and hence deteriorating various fastnesses of the image area and worsening the image running at high temperature and humidity.

In the invention, the ink may comprise a polymer compound incorporated therein. The term "polymer compound" as used herein is meant to indicate all polymer compounds having a number-average molecular weight of not smaller than 5,000 contained in the ink. Examples of these polymer compounds include water-soluble polymer compounds substantially soluble in an aqueous medium, water-dispersible polymer compounds such as polymer latex and polymer emulsion, and alcohol-soluble polymer compounds soluble in polyvalent alcohols used as auxiliary solvents. All polymer compounds are included in the polymer compounds of the invention so far as they can be substantially uniformly dissolved or dispersed in the ink solution.

Specific examples of the water-soluble polymer compounds employable herein include water-soluble polymers such as polyvinyl alcohol, silanol-modified polyvinyl alcohol, carboxymethyl cellulose, hydroxyethyl cellulose, polyvinyl pyrrolidone, polyalkylene oxide (e.g., polyethylene oxide, polypropylene oxide) and polyalkylene oxide derivative, natural water-soluble polymers such as polysaccharide, starch, cationated starch, casein and gelatin, aqueous acrylic resins such as polyacrylic acid, polyacrylamide and copolymer thereof, aqueous alkyd resins, and water-soluble compounds which have $-SO_3^-$ or $-COO^-$ group and thus are substantially soluble in an aqueous medium.

Examples of the polymer latexes include styrene-butadiene latexes, styrene-acryl latexes, and polyurethane latexes. Examples of the polymer emulsions include acryl emulsions.

These water-soluble polymer compounds may be used singly or in combination of two or more thereof.

Such a water-soluble polymer compound is used as a viscosity adjustor to adjust the ink viscosity to a value falling within a range that provides the ink a good ejectability. When the added amount of the water-soluble polymer compound is too great, the resulting ink exhibits too high a viscosity that deteriorates the ejection stability of the ink solution. Thus, when time elapses, the ink undergoes precipitation, causing clogging of the nozzle.

The added amount of the polymer compound to be used as a viscosity adjustor depends on the molecular weight of the polymer compound added (The greater the molecular weight of the polymer compound to be added is, the smaller is the added amount thereof) but is normally from 0% to 5% by weight, preferably from 0% to 3% by weight, more preferably from 0% to 1% by weight based on the total amount of the ink composition.

In the invention, as a surface tension adjustor there may be used a nonionic, cationic or anionic surface active agent besides the aforementioned surface active agents. Examples of the surface tension adjustor employable herein include nonionic, cationic and anionic surface active agents. Examples of the anionic surface active agent include aliphatic acid salt, alkylsulfuric acid ester salt, alkylbenzenesulfonate salt, alkylnapthalenesulfonate salt, dialkylsulfosuccinate salt, alkylphosphoric acid ester salt, naphthalenesulfonic acid-formalin condensate and polyoxyethylenealkyl sulfuric acid ester salt. Examples of the nonionic surface active agent include polyoxyethylenealkyl ether, polyoxyethylenealkylallyl ether, polyoxyethylene aliphatic acid ester, sorbitanaliphatic acid ester, polyoxyethylenesorbitanaliphatic acid ester, polyoxyethylenealkylamine, glycerinaliphaticacidester and oxyethyleneoxypropylene block copolymer. SURFYNOLS (produced by Air Products & Chemicals Inc.), which are acetylene-based polyoxyethylene oxide surface active agents, are preferably used as well. Further, amine oxide-based amphoteric surface active agents such as N,N-dimethyl-N-alkylamine oxide are preferred. Moreover, those listed as surface active agents in JP-A-59-157,636, pp. 37 to 38, and Research Disclosure No. 308119, 1989, may be used.

The surface tension of the ink of the invention is preferably from 20 to 60 mN/m, more preferably from 25 to 45 mN/m regardless of whether or not these surface tension adjustors are used.

In the invention, as the dispersant and dispersion stabilizer there may be used the aforementioned various cationic, anionic and nonionic surface active agents as necessary. As the anti-forming agent there may be used a fluorine-based or silicone-based compound or a chelating agent such as EDTA as necessary.

The recording paper and recording film to be used in the invention will be described hereinafter. As the support in the recording paper or recording film there may be used one obtained by processing a chemical pulp such as LBKP and NBKP, a mechanical pulp such as GP, PGW, RMP, TMP, CTMP, CMP and CGP, used paper pulp such as DIP or the like, optionally mixed with known additives such as pigment, binder, sizing agent, fixing agent, cationic agent and paper strength improver, through various paper machines such as foundrinier paper machine and cylinder paper machine. As the support there may be used either a synthetic paper or plastic film sheet besides these support materials. The thickness of the support is preferably from 10 μm to 250 μm. The basis weight of the support is preferably from 10 to 250 g/m².

An image-receiving layer and a back coat layer may be provided on the support directly or with a size press or anchor coat layer of starch, polyvinyl alcohol or the like interposed therebetween to prepare a material for receiving the ink of the invention. The support may be further subjected to leveling using a calendering machine such as machine calender, TG calender and soft calender.

In the invention, as the support there is preferably used a paper or plastic film laminated with a polyolefin (e.g., polyethylene, polystyrene, polybutene, copolymer thereof) or polyethylene terephthalate on both sides thereof. The polyolefin preferably comprises a white pigment (e.g., titanium oxide, zinc oxide) or a tinting dye (e.g., cobalt blue, ultramarine, neodymium oxide) incorporated therein.

The image-receiving layer to be provided on the support comprises a porous material or aqueous binder incorporated therein. The image-receiving layer also preferably comprises a pigment incorporated therein. As such a pigment there is preferably used a white pigment. Examples of the white pigment employable herein include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfate and zinc carbonate, and organic pigments such as styrene-based pigment, acrylic pigment, urea resin and melamine resin. Particularly preferred among these pigments are porous inorganic white pigments. In particular, synthetic amorphous silica having a large pore area, etc. are preferred. As the synthetic amorphous silica there maybe also used anhydrous silicate obtained by dry method (gas phase method) or hydrous silicate obtained by wet method.

Specific examples of the recording paper comprising the aforementioned pigments incorporated in the image-receiving layer include those disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-174992, JP-A-11-192777, and JP-A-2001-301314.

Examples of the aqueous binder to be incorporated in the image-receiving layer include water-soluble polymers such as polyvinyl alcohol, silanol-modified polyvinyl alcohol, starch, cationated starch, casein, gelatin, carboxymethyl cellulose, hydroxyethyl cellulose, polyvinyl pyrrolidone, polyalkylene oxide and polyalkylene oxide derivative, and water-dispersible polymers such as styrene butadiene latex and acryl emulsion. These aqueous binders may be used singly or in combination of two or more thereof. In the invention, particularly preferred among these aqueous binders are polyvinyl alcohol and silanol-modified polyvinyl alcohol from the standpoint of adhesion to pigment and exfoliation resistance of ink-receiving layer.

The ink-receiving layer may comprise a mordant, a waterproofing agent, a light-resistance improver, a gas resistance improver, a surface active agent, a film hardener and other additives incorporated therein besides the pigments and aqueous binders.

The mordant to be incorporated in the image-receiving layer is preferably passivated. To this end, a polymer mordant is preferably used.

For the details of the polymer mordant, reference can be made to JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing a polymer mordant disclosed in JP-A-1-161236, pp. 212 to 215. The use of the polymer mordant disclosed in the above cited patent makes it possible to obtain an image having an excellent quality and hence improve the light-resistance of the image.

The waterproofing agent can be used to render the image waterproof. As such a waterproofing agent there is preferably used a cationic resin in particular. Examples of such a cationic resin include polyamide polyamine epichlorohydrin, polyethylenimine, polyamine sulfone, dimethyl diallyl ammonium chloride polymer, and cation polyacrylamide. The content of such a cation resin is preferably from 1% to 15% by weight, particularly from 3% to 10% by weight based on the total solid content of the ink-receiving layer.

Examples of the light-resistance improver and gas resistance improver include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl-containing compounds, ester compounds, amide compounds, ether compounds, alcohol compounds, sulfinic acid compounds, saccharides, water-soluble reducing compounds, organic acids, inorganic acids, hydroxyl-containing organic acids, benzotriazole compounds, benzophenone compounds, triazine compounds, heterocyclic compounds, water-soluble metal salts, organic metal compounds and metal complexes.

Specific examples of these compounds include those disclosed in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258 and JP-A-11-321090.

The surface active agent acts as a coating aid, releasability improver, slipperiness improver or antistat. For the details of the surface active agent, reference can be made to JP-A-62-173463 and JP-A-62-183457.

An organic fluoro-compounds may be used instead of the surface active agent. The organic fluoro-compound is preferably hydrophobic. Examples of the organic fluoro-compound include fluorine-based surface active agents, oil-based fluorine compounds (e.g., fluorine-based oil), and solid fluorine-based compound resins (e.g., tetrafluoroethylene resin). For the details of the organic fluoro-compound, reference can be made to JP-B-57-9053 (8th to 17th columns), JP-A-61-20994, and JP-A-62-135826.

As the film hardener there may be used any of materials disclosed in JP-A 1-161236, page 222, JP-A-9-263036, JP-A-10-119423, and JP-A-2001-310547.

Other examples of additives to be incorporated in the image-receiving layer include pigment dispersants, thickening agents, anti foaming agents, dyes, fluorescent brighteners, preservatives, pH adjustors, matting agents, and film hardeners. There may be provided one or two ink-receiving layers.

The recording paper and recording film may comprise a back coat layer provided thereon. Examples of the components which can be incorporated in the back coat layer include white pigments, aqueous binders, and other components.

Examples of the white pigments to be incorporated in the back coat layer include inorganic white pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, hydrated halloysite, magnesium carbonate and magnesium hydroxide and organic pigments such as styrene-based plastic pigment, acrylic plastic pigment, polyethylene, microcapsule, urea resin and melamine resin.

Examples of the aqueous binder to be incorporated in the back coat layer include water-soluble polymers such as styrene/maleate copolymer, styrene/acrylate copolymer, polyvinyl alcohol, silanol-modified polyvinyl alcohol, starch, cationated starch, casein, gelatin, carboxymethyl cellulose, hydroxyethyl cellulose and polyvinylpyrrolidone, and water-dispersible polymers such as styrenebutadiene latex and acryl emulsion. Examples of other components to be incorporated in the back coat layer include antifoaming agents, foaming inhibitors, dyes, fluorescent brightening agents, preservatives and waterproofing agents.

The layers (including back layer) constituting the ink jet recording paper and film may comprise a fine dispersion of polymer incorporated therein. The fine dispersion of polymer is used for the purpose of improving physical properties of film, e.g., stabilizing dimension, inhibiting curling, adhesion and film cracking. For the details of the fine dispersion of polymer, reference can be made to JP-A-62-245258, JP-A-62-136648, and JP-A-62-110066. The incorporation of a fine dispersion of polymer having a glass transition temperature as low as not higher than 40° C. in a layer containing a mordant makes it possible to prevent the cracking or curling of the layer. The incorporation of a fine dispersion of polymer having a high glass transition temperature, too, in the back layer makes it possible to prevent the curling of the back layer.

The ink jet recording method to which the ink set of the invention is applied is not limited. The ink set of the invention may be used in any known recording method such as electrostatic control method which utilizes electrostatic attraction to eject ink, drop-on-demand method (pressure pulse method) utilizing vibrational pressure of piezoelectric element, acoustic ink jet method which comprises converting electrical signal to acoustic beam with which the ink is irradiated to produce a radiation pressure that is utilized to eject the ink and thermal ink jet (bubble jet) method which comprises heating the ink to form bubbles that raise the pressure to eject the ink.

Examples of the ink jet recording method include a method which comprises ejecting many portions of an ink having a low concentration called photoink in a small volume, a method which comprises using a plurality of inks having substantially the same hue but different densities to improve the image quality, and a method involving the use of a colorless transparent ink.

The ink for ink jet recording method of the invention can be used for purposes other than ink jet recording. These purposes include display image material, image-forming material for indoor decoration material and image-forming material for outdoor decoration material.

Examples of the display image material include various materials such as poster, wall paper, small decoration articles (ornament, doll, etc.), commercial flyer, wrapping paper, wrapping material, paper bag, vinyl bag, packaging material, signboard, picture drawn or attached to the side of traffic facilities (automobile, bus, train, etc.) and clothing with logogram. In the case where the dye of the invention is used as a material for forming a display image, the term "image" as used herein means an image in a narrow sense as well as all dye patterns perceivable by human being such as abstract design, letter and geometrical pattern.

The term "indoor decoration material" as used herein is meant to include various materials such as wall paper, small decoration articles (ornament, doll, etc.), members of lighting fixture, members of furniture and design members of floor and ceiling. In the case where the dye of the invention is used as an image-forming material, the term "image" as used herein means an image in a narrow sense as well as all dye patterns perceivable by human being such as abstract design, letter and geometrical pattern.

The term "outdoor decoration material" as used herein is meant to include various materials such as wall material, roofing material, signboard, gardening material, small outdoor decoration articles (ornament, doll, etc.) and members of outdoor lighting fixture. In the case where the dye of the invention is used as an image-forming material, the term "image" as used herein means an image in a narrow sense as well as all dye patterns perceivable by human being such as abstract design, letter and geometrical pattern.

Examples of the media on which patterns are formed in these uses include various materials such as paper, fiber, cloth (including nonwoven cloth), plastic, metal and ceramics. Dyeing can be carried out by mordanting or printing. Alternatively, a dye can be fixed in the form of reactive dye having a reactive group incorporated therein. Preferred among these dyeing methods is mordanting.

During the production of the ink, dissolution of additives such as dye may be assisted by sound vibration.

Sound vibration is effected to prevent the ink from forming bubbles when given pressure by the recording head. In some detail, a sound energy which is not smaller than that given by the recording head is given during the production of the ink to remove bubbles.

Sound vibration normally indicates ultrasonic wave having a frequency of not lower than 20 kHz, preferably not lower than 40 kHz, more preferably 50 kHz. The energy which is given to the ink solution by sound vibration is normally not lower than $2\times10^7$ J/m$^3$, preferably not lower than $5\times10^7$ J/m$^3$, more preferably not lower than $1\times10^8$ J/m$^3$. The time during which sound vibration is given to the ink solution is normally from about 10 minutes to 1 hour.

Sound vibration can be effected at any time after the provision of the dye to the media to exert the desired effect. Sound vibration may be effected also after the storage of the finished ink to exert the desired effect. However, it is preferred that sound vibration be given during dissolution and/or dispersion of the dye in the media to exert a higher defoaming effect and accelerate the dissolution and/or dispersion of the dye in the media.

In some detail, the step at which at least sound vibration is given may be effected at any time during or after the dissolution and/or dispersion of the dye in the media. In other words, the step at which at least sound vibration is given may be arbitrarily effected once or more times between after the production of the ink and the completion of the product.

In a preferred embodiment, the step of dissolving and/or dispersing the dye in the medium consists of a step of dissolving the dye in part of the medium and a step of adding the rest of the medium to the solution. Preferably, sound vibration is given at at least any one of the two steps. More preferably, at least sound vibration is given at the step of dissolving the dye in part of the medium.

The step of adding the rest of the medium to the solution may be a single step or may consist of a plurality of steps.

During the production of the ink according to the invention, heat deaeration or vacuum deaeration is preferably effected to enhance the effect of removing bubbles from the ink. Heat deaeration or vacuum deaeration is preferably effected at the same time with or after the step of adding the rest of the medium to the solution.

Examples of the unit for generating sound vibration at the step of giving sound vibration include known devices such as ultrasonic dispersing machine.

In the process for the preparation of the ink of the invention, it is important to effect a step of removing dust as solid content by filtration after the preparation of the ink. For this job, a filter is used. As such a filter there is used a filter having an effective pore diameter of not greater than 1 μm, preferably from not smaller than 0.05 μm to not greater than 0.3 μm, particularly from not smaller than 0.25 μm to not greater than 0.3 μm. As the filter material there may be used any of various known materials. In the case where a water-soluble dye ink is used, a filter prepared for aqueous solvent is preferably used. In particular, a filter made of a polymer material which can difficultly give dust is preferably used. Filtration may be accomplished by pumping the solution through the filter or may be effected under pressure or reduced pressure.

Filtration is often accompanied by the entrapment of air in the solution. Bubbles due to air thus entrapped can often cause disturbance in image in the ink jet recording. Thus, the deaeration step is preferably provided separately. Deaeration may be accomplished by allowing the solution thus filtered to stand or by the use of various methods such as ultrasonic deaeration and vacuum deaeration using a commercially available apparatus. The ultrasonic deaeration may be effected preferably for about 30 seconds to 2 hours, more preferably for about 5 minutes to 1 hour.

These jobs are preferably effected in a space such as clean room and clean bench to prevent the contamination by dust. In the invention, these jobs are preferably effected in a space having a cleanness degree of not greater than 1,000 class. The term "cleanness degree" as used herein is meant to indicate the value measured by a dust counter.

The volume of the droplet to be ejected onto the ink recording material of the invention is from not smaller than 0.1 pl to not greater than 100 pl, preferably from not smaller than 0.5 pl to not greater than 50 pl, particularly from not smaller than 2 pl to not greater than 50 pl.

In the invention, the ink jet recording method is not limited. The invention can be applied to any known ink jet recording method such as electrostatic control method which utilizes electrostatic attraction to eject ink, drop-on-demand method (pressure pulse method) utilizing vibrational pressure of piezoelectric element, acoustic ink jet method which comprises converting electrical signal to acoustic beam with which the ink is irradiated to produce a radiation pressure that is utilized to eject the ink and thermal ink jet (bubble jet) method which comprises heating the ink to form bubbles that raise the pressure to eject the ink.

Examples of the ink jet recording method include a method which comprises ejecting many portions of an ink having a low concentration called photoink in a small volume, a method which comprises using a plurality of inks having substantially the same hue but different densities to improve the image quality, and a method involving the use of a colorless transparent ink. The volume of the ink droplet to be ejected is controlled mainly by the print head.

For example, in the thermal ink jet recording system, the volume of the ink droplet to be ejected can be controlled by the structure of the print head. In some detail, the ink droplet can be ejected in a desired size by properly changing the size of the ink chamber, heating zone and nozzle. Even in the thermal ink jet recording system, the ink droplet can be ejected in a plurality of sizes by using a plurality of print heads comprising heating zones and nozzles having different sizes.

In the case of drop-on-demand system using a piezoelectric element, the volume of the ink droplet to be ejected can be varied due to the structure of the print head as in the thermal ink jet recording system. As described later, however, by controlling the waveform of the driving signal for driving the piezoelectric element, the ink droplet can be ejected in a plurality of sizes by the same structure of print head.

In the invention, the frequency at which the ink droplet is ejected onto the recording material is not lower than 1 kHz.

In order to record a high quality image as in photographic system, it is necessary that the ejection density be not smaller than 600 dpi (number of dots per inch) to reproduce an image having a high sharpness with small ink droplets.

In the system involving the ejection of the ink droplet through a head having a plurality of nozzles, on the other hand, the number of heads which can be driven at the same time in a type of recording system involving the cross movement of the recording paper and the head is from scores to about 200. Even in a type having heads called line heads fixed therein, the number of heads which can be driven at the same time is limited to hundreds. This is because the driving electric power is limited or the heat generated on the head gives an adverse effect on the image thus formed, making it impossible to drive a large number of head nozzles at the same time.

By raising the driving frequency, the recording rate can be raised.

The control over the ejection frequency in the case of thermal ink jet recording system can be accomplished by controlling the frequency of the head driving signal for heating the head.

In the piezoelectric system, the control over the ejection frequency can be accomplished by controlling the frequency of the signal for driving the piezoelectric element.

The driving of piezoelectric element will be described hereinafter. The image signal to be printed is made as follows. In some detail, the size of ink droplet to be ejected, the ejection rate and the ejection frequency are determined at the printer control. Thus, the signal for driving the print head is developed. The driving signal thus developed is then supplied into the print head. The size of ink droplet to be ejected, the ejection rate and the ejection frequency are controlled by the signal for driving the piezoelectric element. The size of ink droplet to be ejected and the ejection rate are determined by the shape and amplitude of the driving waveform and the ejection frequency is determined by the repetition frequency of the signal.

When the ejection frequency is predetermined to 10 kHz, the head is driven every 100 microseconds. One line of recording is finished in 400 microseconds. By predetermining the moving rate of the recording paper such that it moves at a rate of 1/600 inch or about 42 micrometers per 400 microseconds, printing can be made at a rate of one sheet per 1.2 seconds.

The configuration of the printing device to which the invention can be applied is preferably in an embodiment disclosed in JP-A-11-170527. The configuration of the ink cartridge to which the invention can be applied is preferably in an embodiment disclosed in JP-A-5-229133. The configuration of the suction system and the cap covering the print head 28 are preferably in an embodiment disclosed in JP-A-7-276671. It is preferred that a filter for evacuating bubbles as disclosed in JP-A-9-277552 be provided in the vicinity of the head.

The surface of the nozzle is preferably subjected to water repellent treatment as disclosed in Japanese Patent No. 2002/292878. The invention may be used with a printer connected to computer. The invention may be used with an apparatus dedicated for printing photograph.

In the ink jet recording method of the invention, the ink set for ink jet recording comprising at least one of the dyes represented by the general formula (1) dissolved and/or dispersed in an aqueous medium preferably operates in such a manner that the ink droplet is ejected onto the recording material at an average rate of not smaller than 2 m/sec, preferably not smaller than 5 m/sec.

The control over the ejection rate is accomplished by controlling the form and amplitude of the signal for driving the head.

By using a plurality of driving waveforms properly, ink droplets having a plurality of sizes can be ejected by the same head.

[Color Toner]

As the binder resin for color toner in which the dye of the invention is incorporated there may be used any binder commonly used for toner. Examples of the binder employable herein include styrene-based resins, acrylic resins, styrene-acryl-based resins, and polyester resins.

To the toner may be externally added an inorganic particulate material and an organic particulate material for the purpose of enhancing the flow characteristics thereof, controlling the chargeability thereof or like purposes. Particulate silica or titania the surface of which has been treated with an alkyl group-containing coupling agent is preferably used. These particulate materials preferably have a number-average primary particle diameter of from 10 to 500 nm. These particulate materials are preferably incorporated in the toner in an amount of from 0.1 to 20% by weight.

As a release agent there may be used any release agent which has hereto fore been used for toner. Specific examples of the release agent employable herein include olefins such as low molecular polypropylene, low molecular polyethylene and ethylene-propylene copolymer, microcrystalline wax, carnauba wax, sasol wax, and paraffin wax. The added amount of the release agent is preferably from 1 to 5% by weight based on the weight of the toner.

A charge controller may be added to the toner as necessary. The charge controller is preferably colorless from the standpoint of color developability. Examples of the charge controller employable herein include those having a quaternary ammonium salt structure, and those having a calixarene structure.

As a carrier there may be used either an uncoated carrier comprising only a magnetic particulate material such as iron and ferrite or a coated carrier comprising a magnetic particulate material coated with a resin or the like. The average particle diameter of the carrier is preferably from 30 to 150 µm as calculated in terms of volume-average particle diameter.

The image forming process to which the toner of the invention is applied is not specifically limited. Examples of the image forming process employable herein include a process which comprises repeatedly forming a color image on a photoreceptor, and then transferring the color image to form an image, and a process which comprises transferring images formed on a photoreceptor successively onto an intermediate transferring material to form a color image on the intermediate transferring material, and then transferring the color image onto an image-forming member such as paper to form the desired color image.

[Heat-Sensitive Transferring Material]

The heat-sensitive recording material of the invention comprises an ink sheet comprising a dye of the invention spread with a binder over a support and an image-receiving sheet for fixing a dye which has moved according to heat energy given by a thermal head according to image-recording signal.

The ink sheet can be formed by dissolving the aforementioned dye in a solvent with a binder or dispersing the aforementioned dye in a solvent to prepare an ink solution, spreading the ink solution over a support, and then properly drying the coated material.

As the binder resin, ink solvent, support and image-receiving sheet to be used in the invention there are preferably used those disclosed in JP-A-7-137466.

In order to apply the heat-sensitive recording material to a heat-sensitive recording material allowing full-color image recording, the heat-sensitive recording material is preferably formed by spreading a cyan ink sheet containing a heat-diffusive cyan dye capable of forming a cyan image, a magenta ink sheet containing a heat-diffusive yellow dye capable of forming a magenta image and a yellow ink sheet containing a heat-diffusive yellow dye capable of forming a yellow image successively over a support. Further, an ink sheet containing a black image-forming material may be formed on the support as necessary.

[Color Filter]

As the process for the formation of a color filter there may be used a process which comprises forming a pattern with a photoresist, and then dyeing the pattern or a process which comprises forming a pattern with a photoresist having a coloring agent incorporated therein as disclosed in JP-A-4-163552, JP-A-4-128703, JP-A-4-175753, etc. As the process for incorporating the dye in the color filter there may be used any process. Preferred examples of such a process employable herein include those disclosed in JP-A-4-175753 and JP-A-6-35182, i.e., color filter forming process which spreading a positive resist composition comprising a thermosetting resin, a quinonediazide compound, a crosslinking agent, a coloring agent and a solvent over a substrate, exposing the coated substrate to light through a mask, developing the exposed area to form a positive resist pattern, exposing the entire surface of the positive resist pattern to light, and then curing the positive resist pattern thus exposed. Alternatively, a black matrix can be formed according to an ordinary process to obtain RGB primary-based or Y.M.C complementary-based color filter.

For the details of the thermosetting resin, quinonediazide compound, crosslinking agent and solvent employable herein and the content thereof, reference can be made to the above cited patents.

EXAMPLE

The invention will be further described in the following examples, but the invention is not construed as being limited thereto.

Example 1

(Preparation of Aqueous Ink)

To the following components was added deionized water to make 1 l. The mixture was then heated to a temperature of from 30° C. to 40° C. with stirring for 1 hour. The mixture was adjusted with 10 mol/l KOH to pH 9, and then filtered through a microfilter having an average pore diameter of 0.25 μm under pressure to prepare an ink solution A.

| Composition of ink solution A | |
|---|---|
| Azo dye of the invention (Exemplary Compound a-1) | 8.5 g/l |
| Diethylene glycol | 150 g/l |

| -continued | |
|---|---|
| Composition of ink solution A | |
| Urea | 37 g/l |
| Glycerin | 130 g/l |
| Triethylene glycol monobutyl ether | 130 g/l |
| Triethanolamine | 6.9 g/l |
| Benzotriazole | 0.08 g/l |
| Surfinol 465 | 10 g/l |
| PROXEL XL | 3.5 g/l |

Ink solutions B to H were prepared in the same manner as the ink solution A except that the dye was changed as set forth in Table 1 below.

(Image Recording and Evaluation)

Using a Type PM-700C ink jet printer (produced by SEIKO EPSON CORPORATION), an image was recording on a photographic gloss paper (superphoto grade ink jet paper produced by Fuji Photo Film Co., Ltd.) with the ink solutions A to H thus prepared.

The image thus obtained was then evaluated for light-fastness and ozone resistance.

For the evaluation of hue, broad color tone of black dye on long wavelength side at λmax of about 590 nm was visually examined. The measurements were then evaluated according to a three-step criterion, i.e., excellent, good and poor. The results of evaluation are set forth in Table 1 below. In Table 1, G indicates that the hue is best, F indicates that the hue is good and P indicates that the hue is poor.

For the evaluation of light-fastness, the image formed was immediately measured for image density Ci. Using a weatherometer (Atlas C. 165), the image was then irradiated with xenon light (85,000 lux) for 14 days. The image was then again measured for image density Cf. The percent dye remaining ($\{Ci-Cf\}/Ci)\times100\%$) was calculated from the difference in image density between before and after irradiation with xenon. For the measurement of image density, a Type X-Rite310TR reflection densitometer was used.

The percent dye remaining was measured at three points of reflection density, i.e., 1, 1.5 and 2.0. The results of evaluation are set forth in Table 1 below. In Table 1, those showing a percent dye remaining of 80% or more at all these density points are judged good (G), those showing a percent dye remaining of less than 80% at two of the three density points are judged fair (F) and those showing a percent dye remaining of less than 80% at all the three density points are judged poor (P).

For the evaluation of ozone gas resistance, the image recorded was immediately allowed to stand in a box having an ozone gas concentration predetermined to 0.5 ppm for 24 hours. The image density was measured using a Type X-Rite310TR reflection densitometer before and after exposure to ozone gas. The difference in image density between before and after exposure to ozone gas was then evaluated as percent dye remaining. The measurement was made at three points of reflection density, i.e., 1, 1.5 and 2.0. The ozone gas concentration in the box was measured using a Type OZG-EM-01 ozone gas monitor (produced by APPLICS INC.). The results were evaluated according to a three-step criterion. In other words, those showing a percent dye remaining of 70% or more at all these points are judged good (G), those showing a percent dye remaining of less than 70% at one or two of these density points are judged fair (F), and those showing a percent dye remaining of less than 70% are judged poor (P).

TABLE 1

| Ink | Dye | Hue | Light-fastness | Ozone gas resistance |
|---|---|---|---|---|
| A | a-1 | G | G | G |
| B | a-3 | G | G | G |
| C | a-5 | G | G | G |
| D | b-1 | G | G | G |
| E | b-5 | G | G | G |
| F | Comparative Dye (1) | F | P | P |
| G | Comparative Dye (2) | F | P | P |
| H | Comparative Dye (3) | F | P | P |

The structure of Comparative Dyes 1 to 3 set forth in Table 1 above are as follows.

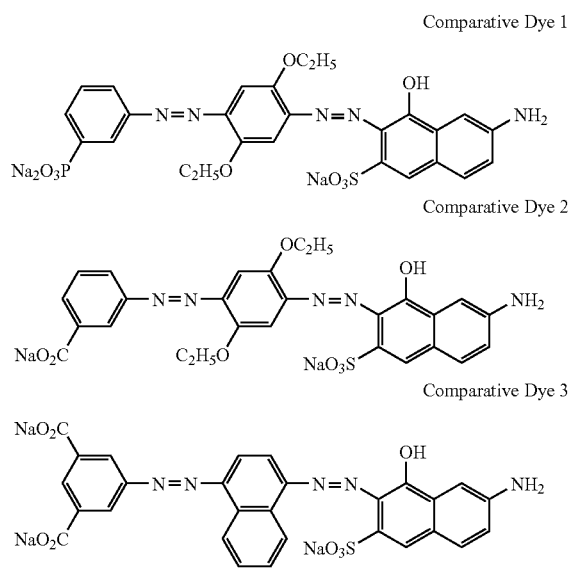

As can be seen in the results of Table 1 above, the images obtained with the ink solutions A to E of the invention were better than the images obtained with the comparative ink solutions. Further, the images obtained with the ink solutions of the invention were excellent in light-fastness and ozone gas resistance.

Using a Type PM-700C ink jet printer (produced by SEIKO EPSON CORPORATION), an image was recorded on a Type MJA4S3P superfine dedicated gloss paper (produced by SEIKO EPSON CORPORATION) with the ink solutions A to E. The image thus obtained was then evaluated for hue and light-fastness. Results similar to that set forth in Table 1 were obtained.

Example 2

[Preparation of Sample 201]

4.83 g of an azo dye (Exemplary Compound c-1: oil-soluble dye) and 7.04 g of sodium dioctylsulfo succinate were dissolved in a mixture of 4.22 g of the following high boiling organic solvent (s-2), 5.63 g of the following high boiling organic solvent and 50 ml of ethyl acetate at 70° C. To the solution thus obtained was then added 500 ml of deionized water with stirring using a magnetic stirrer to prepare an oil-in-water type coarse dispersion. Subsequently, the coarse dispersion was passed through a microfluidizer (produced by MICROFLUIDEX INC.) five times at a pressure of 600 bar to undergo atomization. The emulsion thus prepared was then desolvated by a rotary evaporator until the odor of ethyl acetate was eliminated. To the fine emulsion of hydrophobic dye thus obtained were then added 140 g of diethylene glycol, 50 g of glycerin, 7 g of SURFYNOL 465 (produced by Air Products & Chemicals) and 900 ml of deionized water to prepare an ink.

The high boiling solvents used have the following structures.

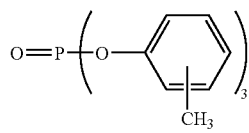

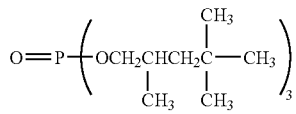

(Preparation of Samples 202 to 204)

Samples 202 to 204 were prepared in the same manner as Sample 201 except that the azo dye of Sample 201 (Specific Example c-1: oil-soluble dye) was changed to the azo dye set forth in Table 2 below (oil-soluble dye) The emulsion dispersion inks of Samples 201 to 204 thus obtained were each then measured for volume-average particle size using a Type UPA microtrack (produced by NIKKISO CO., LTD.) The results are set forth in Table 2 below.

(Image Recording and Evaluation)

Ink Samples 201 to 204 and Comparative Ink Samples (Inks F to H) were each then evaluated as follows. The results are set forth in Table 2 below.

In Table 2, the evaluation of "color tone", "paper dependence", "water resistance" and "light-resistance" were made on the image recorded on a photographic gloss paper (photograde ink jet paper produced by Fuji Photo Film Co., Ltd.) with these inks using a type PM-700C ink jet printer (produced by SEIKO EPSON CORPORATION).

<Color Tone>

The image recorded was measured for reflection spectrum at an interval of 10 nm in a wavelength range of from 390 nm to 730 nm. Further, broad color tone of black dye on long wavelength side at λmax of about 590 nm was visually examined. The measurements were then evaluated according to a three-step criterion, i.e., excellent (A), good (E) and poor (C).

<Paper Dependence>

The image formed on the aforementioned photographic gloss paper and the image formed separately on an ordinary paper for PPC were compared with each other in color tone. The results were then evaluated according to a two-step criterion. In other words, those showing a small difference in color tone between the two images were judged A (good) and those showing a great different in color tone between the two images were judged B (poor).

<Water Resistance>

The aforementioned photographic gloss paper on which an image had been formed was dried at room temperature for 1 hour, dipped in water for 30 seconds, allowed to dry at room temperature, and then observed for stain. The results were evaluated according to a three-step criterion. In other words, those showing no stain were judged A, those showing little stain were judged B and those showing much stain were judged C.

<Light-Resistance>

Using a weatherometer (Atlas C. 165), the aforementioned photographic gloss paper on which an image had been formed was then irradiated with xenon light (85,000 lux) for 3 days. The image was measured for image density before and after exposure to Xenon light using a Type X-Rite310TR reflection densitometer. The difference in image density between before and after exposure to xenon light was then evaluated as percent dye remaining. Measurement was made at three points of reflection density, i.e., 1, 1.5 and 2.0.

The results were evaluated according to a three-step criterion. In other words, those showing a percent dye remaining of 70% or more at all these density points are judged A, those showing a percent dye remaining of less than 70% at one or two of the three density points are judged B and those showing a percent dye remaining of less than 70% at all the three density points are judged C.

<Ozone Resistance>

For the evaluation of ozone gas resistance, the aforementioned photographic gloss paper on which an image had been recorded was allowed to stand in a box having an ozone gas concentration predetermined to 0.5 ppm for 24 hours. The image density was measured using a Type X-Rite310TR reflection densitometer before and after exposure to ozone gas. The difference in image density between before and after exposure to ozone gas was then evaluated as percent dye remaining. The measurement was made at three points of reflection density, i.e., 1, 1.5 and 2.0. The ozone gas concentration in the box was measured using a Type OZG-EM-01 ozone gas monitor (produced by APPLICS INC.).

The results were evaluated according to a three-step criterion. In other words, those showing a percent dye remaining of 70% or more at all these points are judged A, those showing a percent dye remaining of less than 70% at one or two of these density points are judged B, and those showing a percent dye remaining of less than 70% are judged C.

TABLE 2

| Sample | Dye | Average particle size (nm) | Hue | Paper dependence | Water resistance | Light-resistance | Ozone resistance |
|---|---|---|---|---|---|---|---|
| 201 | c-1 | 53 | A | A | A | A | A |
| 202 | c-2 | 51 | A | A | A | A | A |
| 203 | c-3 | 58 | A | A | A | A | A |
| 204 | c-4 | 49 | A | A | A | A | A |
| Ink F | Comparative Dye (1) | — | B | B | B | C | C |
| Ink G | Comparative Dye (2) | — | B | B | B | C | C |
| Ink H | Comparative Dye (3) | — | B | B | B | C | C |

As can be seen in Table 2 above, the inks for ink jet recording of the invention exhibit excellent color developability and hue, a small paper dependence and excellent water resistance and light-resistance.

Example 3

The same ink as prepared in Example 2 was packed in the cartridge of a Type BJ-F850 ink jet printer (produced by Canon Co., Ltd.). Using this ink jet printer, an image was printed on a Type GP-301 photographic gloss paper (produced by Canon Co., Ltd.) The image thus recorded was then evaluated in the same manner as in Example 2. Results similar to that of Example 2 were then obtained.

The novel azo dye of the invention has a sufficient fastness to light, heat, moisture and active gases in the atmosphere and an excellent hue.

The image-forming coloring composition of the invention comprises a novel dye which exhibits absorption characteristics allowing an excellent color reproducibility as a black dye and has a sufficient fastness to light, heat, moisture and active gases in the atmosphere and thus can provide a colored image or coloring material excellent in hue and fastness. The image-forming coloring composition of the invention is suitable particularly for the preparation of a printing ink for ink jet recording, etc., an ink sheet in heat-sensitive recording material, a color toner for electrophotography, a color filter for display such as LCD and PDP or imaging device such as CCD and a dyeing solution for dyeing various fibers.

The ink for ink jet recording and the ink jet recording method using the aforementioned coloring composition of the invention can form an image having a good hue and a high fastness to light and ambient active gases, particularly ozone gas.

The color toner formed by the coloring composition of the invention exhibits an excellent light-fastness, a faithful color reproducibility and a high OHP quality.

The entire disclosure of each and every foreign patent application from which the benefit of foreign priority has been claimed in the present application is incorporated herein by reference, as if fully set forth.

What is claimed is:

1. An azo dye represented by formula (1):

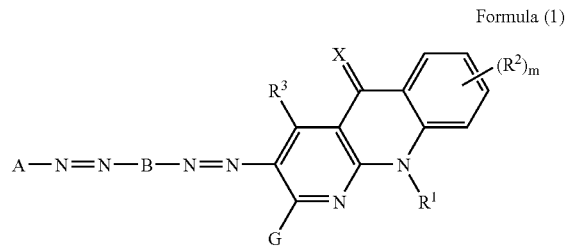

Formula (1)

wherein A and B each independently represents an aromatic group which may be substituted or a heterocyclic group which may be substituted, wherein A is a monovalent group and B is a divalent group;

$R^1$, $R^2$, $R^3$ and G each independently represents a hydrogen atom; a halogen atom; an aliphatic group; an aromatic group; a heterocyclic group; a cyano group; a carboxyl group; a carbamoyl group; an alkoxycarbonyl group; an aryloxycarbonyl group; an acyl group; a hydroxyl group; an alkoxy group; an aryloxy group; a silyloxy group; an acyloxy group; a carbamoyloxy group; a heterocyclic oxy group; an alkoxycarbonyloxy group; an aryloxycarbonyloxy group; an amino group substituted by an alkyl group, an aryl group or a heterocyclic group; an acylamino group; an ureido group; a sulfamoylamino group; an alkoxycarbonylamino group; an aryloxycarbonylamino group; an alkylsulfonylamino group; an arylsulfonylamino group; an alkylthio group; an arylthio group; an alkylarylsulfonyl group; an arylsulfonyl group; an alkylsulfinyl group; an arylsulfinyl group; a sulfamoyl group; a sulfo group; or a heterocyclic thio group, and $R^1$, $R^2$, $R^3$ and G may be substituted;

X represents an oxygen atom or a sulfur atom;

m represents an integer of from 0 to 4 and a number of substituent(s) other than hydrogen atom(s).

2. The azo dye of claim 1,
wherein when m is from 2 to 4, $R^2$'s are the same or different.

3. The azo dye of claim 1,
wherein A is a benzene ring which may be substituted, or a naphthalene ring which may be substituted; and B is a benzene ring which may be substituted, a naphthalene ring which may be substituted, or a heterocyclic ring selected from (a), (b), (c), (d) or (e):

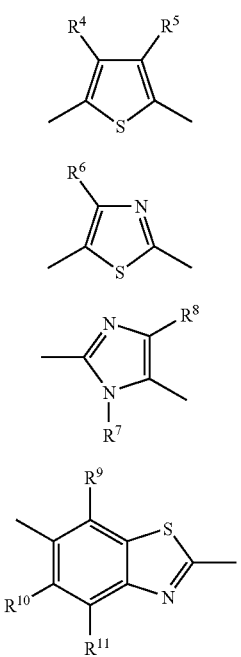

-continued

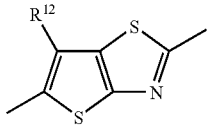

(e)

wherein $R^4$ to $R^{12}$ each independently represents a hydrogen atom; a halogen atom; an aliphatic group; an aromatic group; a heterocyclic group; a cyano group; a carboxyl group; a carbamoyl group; an alkoxycarbonyl group; an aryloxycarbonyl group; an acyl group; a hydroxyl group; an alkoxy group; an aryloxy group; a silyloxy group; an acyloxy group; a carbamoyloxy group; a heterocyclic oxy group; an alkoxycarbonyloxy group; an aryloxycarbonyloxy group; an amino group substituted by an alkyl group, an aryl group or a heterocyclic group; an acylamino group; an ureido group; a sulfamoylamino group; an alkoxycarbonylamino group; an aryloxycarbonylamino group; an alkylsulfonylamino group; an arylsulfonylamino group; a nitro group; an alkylthio group; an arylthio group; an alkylarylsulfonyl group; an arylsulfonyl group; an alkylsulfinyl group; an arylsulfinyl group; a sulfamoyl group; a sulfo group; or a heterocyclic thio group.

4. An image-forming coloring composition comprising at least one azo dye represented by formula (1) in claim 1.

5. An ink for ink jet recording comprising at least one azo dye represented by formula (1) in claim 1.

6. An ink jet recording method comprising forming an image with an ink for ink jet recording according to claim 5.

7. A heat-sensitive recording material comprising an azo dye according to claim 1.

8. A color toner comprising an azo dye according to claim 1.

9. A color filter comprising an azo dye according to claim 1.

* * * * *